US011881168B2

(12) United States Patent
Wu et al.

(10) Patent No.: US 11,881,168 B2
(45) Date of Patent: Jan. 23, 2024

(54) DISPLAY SCREEN AGING COMPENSATION METHOD, CIRCUIT SYSTEM, AND ELECTRONIC DEVICE

(71) Applicant: Huawei Technologies Co., Ltd., Shenzhen (CN)

(72) Inventors: Lei Wu, Shanghai (CN); Jinsong Wen, Shenzhen (CN); Xiufeng Zhang, Beijing (CN); Jinqin Ai, Shenzhen (CN); Yiyang Zhang, Shenzhen (CN); Haixiao Liu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 40 days.

(21) Appl. No.: 17/640,587

(22) PCT Filed: Sep. 1, 2020

(86) PCT No.: PCT/CN2020/112892

§ 371 (c)(1),
(2) Date: Mar. 4, 2022

(87) PCT Pub. No.: WO2021/043143

PCT Pub. Date: Mar. 11, 2021

(65) Prior Publication Data

US 2022/0343845 A1 Oct. 27, 2022

(30) Foreign Application Priority Data

Sep. 6, 2019 (CN) ......................... 201910843123.4

(51) Int. Cl.

*G09G 3/3233* (2016.01)
*G09G 3/00* (2006.01)
*G09G 3/20* (2006.01)

(52) U.S. Cl.

CPC ........... *G09G 3/3233* (2013.01); *G09G 3/035* (2020.08); *G09G 3/2007* (2013.01);
(Continued)

(58) Field of Classification Search

None
See application file for complete search history.

(56) References Cited

U.S. PATENT DOCUMENTS 10,593,259 B2 3/2020 Deng et al.
10,755,633 B2 8/2020 Tang et al.
(Continued)

FOREIGN PATENT DOCUMENTS

CN 103198790 A 7/2013
CN 103680407 A 3/2014
(Continued)

*Primary Examiner* — Matthew Yeung
(74) *Attorney, Agent, or Firm* — SLATER MATSIL, LLP

(57) ABSTRACT

A display screen aging compensation method, system, and device, the method including obtaining display data of each display area of a display screen having at least one display area, the display data including usage time t of the display area, a maximum gray level value Lev_max that is of each primary color and that is obtained before the display data, and an average gray level value Lev of each primary color of three primary colors within the usage time t, where the usage time is accumulated screen-on time that is of the display area and that is obtained after the display screen is powered on, obtaining a decay ratio of each primary color of the display area based on the display data, and performing aging compensation on each display area based on the decay ratio of each primary color of each display area.

18 Claims, 10 Drawing Sheets

(52) U.S. Cl.
CPC ............... *G09G 2320/0233* (2013.01); *G09G 2320/0242* (2013.01); *G09G 2320/048* (2013.01); *G09G 2320/0673* (2013.01); *G09G 2320/0686* (2013.01); *G09G 2360/16* (2013.01)

(56) References Cited

U.S. PATENT DOCUMENTS

| | | | | |
|---|---|---|---|---|
| 10,997,898 | B2 | 5/2021 | Wang et al. | |
| 2014/0118426 | A1 | 5/2014 | Chun et al. | |
| 2016/0379551 | A1 | 12/2016 | Zhuang et al. | |
| 2017/0042002 | A1 | 2/2017 | Asamura et al. | |
| 2018/0075801 | A1* | 3/2018 | Le ........................ | G09G 3/3233 |
| 2019/0189045 | A1* | 6/2019 | Hwang ................ | G09G 3/2003 |
| 2020/0357336 | A1* | 11/2020 | Xu ....................... | G09G 3/3233 |

FOREIGN PATENT DOCUMENTS

| | | | |
|---|---|---|---|
| CN | 104318893 | A | 1/2015 |
| CN | 106531069 | A | 3/2017 |
| CN | 106935191 | A | 7/2017 |
| CN | 107134273 | A | 9/2017 |
| CN | 107274834 | A | 10/2017 |
| CN | 107864342 | A | 3/2018 |
| CN | 109036277 | A | 12/2018 |
| CN | 109064995 | A | 12/2018 |
| CN | 109300434 | A | 2/2019 |
| CN | 109461406 | A | 3/2019 |
| CN | 109584797 | A | 4/2019 |
| CN | 109686303 | A | 4/2019 |
| CN | 110164398 | A | 8/2019 |
| CN | 110808006 | A | 2/2020 |
| WO | 2007046030 | A1 | 4/2007 |

* cited by examiner

DISPLAY SCREEN AGING COMPENSATION METHOD, CIRCUIT SYSTEM, AND ELECTRONIC DEVICE

CROSS REFERENCE TO RELATED APPLICATIONS

This application is a national stage of International Application No. PCT/CN2020/112892, filed on Sep. 1, 2020, which claims priority to Chinese Patent Application No. 201910843123.4, filed on Sep. 6, 2019. Both of the aforementioned applications are hereby incorporated by reference in their entireties.

TECHNICAL FIELD

This application relates to the field of display technologies, and in particular, to a display screen aging compensation method, a circuit system, and an electronic device.

BACKGROUND

With rapid progress of display technologies, rapid progress is also made in semiconductor element technologies that serve as cores of display apparatuses. For an existing display apparatus, an organic light-emitting diode (Organic Light Emitting Diode, OLED), as a current-type light-emitting device, is increasingly applied to the high-performance display field because the OLED is characterized by self-light-emitting, fast response, a wide angle of view, being manufacturable on a flexible substrate, and the like.

However, during use of an OLED display screen, the screen may become yellowish because blue pixels decay relatively fast. In particular, for a foldable display screen, due to shorter usage duration of a secondary screen that is folded onto the back of a primary screen, the primary screen and the secondary screen differ in a screen decay degree. Therefore, when the primary screen and the secondary screen are unfold for joint display, the primary screen and the secondary screen become yellowish to different degrees, and consequently a display effect difference that a user can perceive is easily generated.

SUMMARY

Embodiments of this application provide a display screen aging compensation method, a circuit system, and an electronic device, to perform aging compensation on a display screen, thereby reducing a display difference.

To achieve the foregoing objective, the following technical solutions are used in the embodiments of this application.

According to a first aspect, an embodiment of this application provides a display screen aging compensation method. The display screen includes at least one display area. The display screen aging compensation method includes: first, obtaining display data of each display area, where the display data includes usage time t of the display area, a maximum gray level value Lev_max that is of each primary color and that is obtained before the display data is obtained, and an average gray level value Lev of each primary color within the usage time t, where the usage time is accumulated screen-on time that is of the display area and that is obtained after the display screen is powered on; next, obtaining a decay ratio of each primary color of the display area based on the display data; and finally, performing aging compensation on each display area based on the decay ratio of each primary color of each display area. Therefore, a first display area of a primary display screen, a second display area of a secondary display screen, and a third display area of a bent screen that are aged to different degrees due to different decay degrees are approximately consistent in color, thereby reducing a display effect difference between the secondary display screen and the primary display screen and a display effect difference between the bent screen and the primary display screen in the foldable display.

Optionally, the display data further includes a maximum brightness value DBV_max that is of the display area and that is obtained before the display data is obtained and an average brightness value DBV of the display area within the usage time t. In this way, after a brightness factor of each display area is considered, the first display area of the primary display screen, the second display area of the secondary display screen, and the third display area of the bent screen can be approximately consistent in both brightness and color, thereby further reducing a display difference between different display areas.

Optionally, the obtaining a decay ratio of each primary color of the display area based on the display data includes: first, obtaining, based on the display data, a corrected aging formula:

$$coef = \exp\left(-\left(\frac{t}{\tau}\left(\frac{DBV}{\mathrm{DBV\_max}}\left(\frac{Lev}{\mathrm{Lev\_max}}\right)^{\gamma}\right)^{k}\right)^{\beta}\right),$$

where coef is the decay ratio of each primary color of the display area, γ is a gamma value of the display screen, and τ, k, and β are constants; next, separately obtaining, based on an aging model of each primary color of the display area, the constants τ, k, and β corresponding to each primary color; and finally, obtaining the decay ratio coef of each primary color of the display area based on the constants τ, k, and β corresponding to each primary color and according to the corrected aging formula. In this way, the decay ratio of each primary color of each display area can be obtained by performing an aging test, with reference to the aging formula and the aging model, on the obtained display data of each display area of the foldable screen, for example, the obtained display data of the first display area of the primary display screen, the obtained display data of the second display area of the secondary display screen, and the obtained display data of the third display area of the bent screen.

Optionally, before the performing aging compensation on each display area based on the decay ratio of each primary color of each display area, the method further includes: first, separately obtaining temperature values of the display area in at least two sampling periods P for obtaining the display data, where each temperature value corresponds to a decay ratio that is of each primary color of the display area and that is obtained in a same sampling period P; and then, performing, with reference to a current temperature value of the display area, weighted averaging on decay ratios of a same primary color that separately correspond to different temperature values, to obtain a decay ratio that is of each primary color of the display area and that is corrected based on the temperature value. In this way, the decay ratio is corrected with reference to a temperature factor, thereby improving aging compensation accuracy.

Optionally, because a temperature change of the display area is a slow change process, a time interval between two adjacent sampling periods for temperature collection may be set to be relatively long. Therefore, an interval between two adjacent sampling periods for temperature and display data collection is greater than or equal to an interval between two adjacent sampling periods only for display data collection.

Optionally, the display screen includes a first display area and at least one second display area. Usage time of the first display area is greater than usage time of the second display area. In this case, a decay degree of the first display area is greater than a decay degree of the second display area.

Optionally, the performing aging compensation on each display area based on the decay ratio of each primary color of each display area includes: first, obtaining, as an input gray level value L_x, one gray level value of each primary color of the first display area from a gray level lookup table of the first display area; next, obtaining an output gray level value L_y corresponding to each input gray level value L_x, to constitute a gray level lookup table of the second display area; next, driving, based on the input gray level value L_x in the gray level lookup table of the first display area, the first display area to perform display; and obtaining, from the gray level lookup table of the second display area based on the input gray level value L_x, the output gray level value L_y that matches the input gray level value L_x, and driving, based on the output gray level value L_y, the second display area to perform display. In this way, respective gray level sets of the secondary display screen and the bent screen are obtained based on the decay ratio by using the primary display screen as a reference, so that gray level values corrected based on the decay ratio can be found in the respective gray level sets of the secondary display screen and the bent screen based on one gray level value corresponding to each primary color of the primary display screen, and then can be output to a DDIC to control the secondary display screen and the bent screen to perform display based on the gray level values in the respective gray level sets, so that the secondary display screen and the bent screen are approximately consistent with the primary display screen in image display brightness and primary colors. Therefore, gray levels of the secondary display screen and the bent screen with shorter usage time are reduced to perform aging compensation on the first display area of the primary display screen, so that display areas with different usage time have a same display effect or approximately same display effects.

Optionally, the obtaining an output gray level value L_y corresponding to each input gray level value L_x includes: obtaining, according to a first compensation formula $L\_y=L\_x*(coef1/coef2)^{(1/\gamma)}$, the output gray level value L_y corresponding to each input gray level value L_x. In this way, based on an input gray level value L_x of each primary color in a gray level range of 0 to 255 in the first display area, an output gray level value L_y of the same primary color in the second display area can be obtained by using the first compensation formula. Therefore, 0 to 255 output gray level values L_y of each primary color in the second display area can constitute one complete gray level lookup table of the second display area. coef1 is a decay ratio of each primary color of the first display area, coef2 is a decay ratio of each primary color of the second display area, r is the gamma value of the display screen, and coef1<coef2.

Optionally, the at least one display area includes a first display area and at least one second display area. The performing aging compensation on each display area based on the decay ratio of each primary color of each display area includes: first, obtaining initial demura data from a demura lookup table, where the initial demura data includes a plurality of demura compensation areas and an input gray level value L_x corresponding to each demura compensation area, and the display area includes at least one demura compensation area; next, obtaining an output gray level value L_y corresponding to each input gray level value L_x, to constitute a gray level lookup table of the demura compensation area; next, driving, based on the output gray level value L_y in a gray level lookup table of each demura compensation area in the display area, the display area to perform display. In this way, the obtained decay ratio of each primary color of each display area is fused with the initial demura data read from a DDIC end, to correct gray level values in the gray level lookup table of each demura compensation area in each display area, so that brightness and a color actually displayed in the display area match the decay ratio of the display area, thereby compensating for aging of the display area. In addition, the first display area of the primary display screen, the second display area of the secondary display screen, and the third display area of the bent screen each include at least one demura compensation area. Therefore, each display area may be further divided into a smaller demura compensation area for aging compensation, thereby improving aging compensation precision.

Optionally, the initial demura data further includes a demura compensation coefficient a and a demura offset b that are corresponding to each demura compensation area. The obtaining an output gray level value L_y corresponding to each input gray level value L_x includes: obtaining, according to a second compensation formula L_y=(a*sqrt(coef_d))*L_x+b, the output gray level value L_y corresponding to each input gray level value L_x. In this way, based on an input gray level value L_x of each primary color in a gray level range of 0 to 255 in the display area, an output gray level value L_y of the same primary color in the display area can be obtained by using the first compensation formula. Therefore, 0 to 255 output gray level values L_y of each primary color in the display area may constitute one complete gray level lookup table that is of the display area and that is corrected based on the decay ratio. coef_d is a decay ratio of each primary color of a demura compensation area, and the decay ratio of each primary color of the demura compensation area is a decay ratio of the same primary color of a display area in which the demura compensation area is located.

Optionally, a method for obtaining the average brightness value DBV of the display area within the usage time t includes: first, obtaining a current brightness value DBV_c of the display area when obtaining the display data; and when the current brightness value DBV_c is 0, keeping the average brightness value DBV of the display area at an average brightness value DBV_aver obtained before the display data is obtained; or when the current brightness value DBV_c is a non-zero value, the average brightness value DBV of the display area meets a formula: DBV=(t*60*DBV_aver+T*DBV_c)/(t*60+T), where a unit of the usage time t is hour, and a unit of the sampling period P is minute. Therefore, the average brightness value DBV of the display area is obtained.

According to a second aspect, an embodiment of this application provides a circuit system. The circuit system includes a display screen aging compensation circuit. The display screen includes at least one display area. The display screen aging compensation circuit is configured to: obtain display data of each display area, where the display data includes usage time t of the display area, a maximum gray level value Lev_max that is of each primary color and that is obtained before the display data is obtained, and an average gray level value Lev of each primary color within the usage time t, where the usage time is accumulated screen-on time that is of the display area and that is obtained after the display screen is powered on; obtain a decay ratio of each primary color of the display area based on the display data; and perform aging compensation on each display area based on the decay ratio of each primary color of each display area. The aging compensation circuit has a same technical effect as the aging compensation method provided in the foregoing embodiment, and details are not described herein again.

Optionally, the display data further includes a maximum brightness value DBV_max that is of the display area and that is obtained before the display data is obtained and an average brightness value DBV of the display area within the usage time t. The obtaining a decay ratio of each primary color of the display area based on the display data specifically includes:

obtaining, based on the display data, a corrected aging formula:

$$coef = \exp\left(-\left(\frac{t}{\tau}\left(\frac{DBV}{\text{DBV\_max}}\left(\frac{Lev}{\text{Lev\_max}}\right)^{\gamma}\right)^{k}\right)^{\beta}\right),$$

where coef is the decay ratio of each primary color of the display area, $\gamma$ is a gamma value of the display screen, and $\tau$, k, and $\beta$ are constants; separately obtaining, based on an aging model of each primary color of the display area, the constants $\tau$, k, and $\beta$ corresponding to each primary color; and obtaining the decay ratio coef of each primary color of the display area based on the constants $\tau$, k, and $\beta$ corresponding to each primary color and according to the corrected aging formula. A technical effect of obtaining decay of each primary color of the display area by the display screen aging compensation circuit based on the display data is the same as that described above, and details are not described herein again.

Optionally, before performing aging compensation on each display area based on the decay ratio of each primary color of each display area, the display screen aging compensation circuit is further configured to: separately obtain temperature values of the display area in at least two sampling periods P for obtaining the display data, where each temperature value corresponds to a decay ratio that is of each primary color of the display area and that is obtained in a same sampling period P; and perform, with reference to a current temperature value of the display area, weighted averaging on decay ratios of a same primary color that separately correspond to different temperature values, to obtain a decay ratio that is of each primary color of the display area and that is corrected based on the temperature value. A technical effect of performing the function by the display screen aging compensation circuit is the same as that described above, and details are not described herein again.

Optionally, the display screen includes a first display area and a second display area. Usage time of the first display area is greater than usage time of the second display area. The performing aging compensation on each display area based on the decay ratio of each primary color of each display area specifically includes: obtaining one gray level value of each primary color of the first display area from a gray level lookup table of the first display area as an input gray level value L_x; and obtaining an output gray level value L_y corresponding to each input gray level value L_x, to constitute a gray level lookup table of the second display area, so that a display driver circuit coupled to the display screen invokes the gray level lookup tables (for example, the gray level lookup table of the first display area and the gray level lookup table of the second display area), and drives the display screen to perform display. A technical effect of performing the function by the display screen aging compensation circuit is the same as that described above, and details are not described herein again.

Optionally, the performing aging compensation on each display area based on the decay ratio of each primary color of each display area specifically includes: obtaining initial demura data from a demura lookup table; and obtaining an output gray level value L_y corresponding to each input gray level value L_x, to constitute a gray level lookup table of a demura compensation area by using L_y, so that a display driver circuit coupled to the display screen invokes the gray level lookup table, and drives the display screen to perform display. The initial demura data includes a plurality of demura compensation areas and an input gray level value L_x corresponding to each demura compensation area, and the display area includes at least one demura compensation area. A technical effect of performing the function by the display screen aging compensation circuit is the same as that described above, and details are not described herein again.

According to a third aspect, an embodiment of this application provides an electronic device, including a display screen, a display screen aging compensation circuit, and a display driver circuit. The display screen includes at least one display area. The display screen aging compensation circuit is configured to: obtain display data of each display area, where the display data includes usage time t of the display area, a maximum gray level value Lev_max that is of each primary color and that is obtained before the display data is obtained, and an average gray level value Lev of each primary color within the usage time t, where the usage time is accumulated screen-on time that is of the display area and that is obtained after the display screen is powered on; obtain a decay ratio of each primary color of the display area based on the display data; and perform aging compensation on each display area based on the decay ratio of each primary color of each display area. The display driver circuit is coupled to the display screen. The display screen aging compensation circuit is coupled to the display driver circuit. The electronic device has a same technical effect as the display screen aging compensation circuit provided in the foregoing embodiment, and details are not described herein again.

Optionally, the display data further includes a maximum brightness value DBV_max that is of the display area and that is obtained before the display data is obtained and an average brightness value DBV of the display area within the usage time t. The obtaining a decay ratio of each primary color of the display area based on the display data specifically includes:

obtaining, based on the display data, a corrected aging formula:

$$coef = \exp\left(-\left(\frac{t}{\tau}\left(\frac{DBV}{\text{DBV\_max}}\left(\frac{Lev}{\text{Lev\_max}}\right)^{\gamma}\right)^{k}\right)^{\beta}\right),$$

where coef is the decay ratio of each primary color of the display area, $\gamma$ is a gamma value of the display screen, and $\tau$, k, and $\beta$ are constants; separately obtaining, based on an aging model of each primary color of the display area, the constants τ, k, and β corresponding to each primary color; and obtaining the decay ratio coef of each primary color of the display area based on the constants τ, k, and β corresponding to each primary color and according to the corrected aging formula. A technical effect of obtaining decay of each primary color of the display area by the display screen aging compensation circuit in the electronic device based on the display data is the same as that described above, and details are not described herein again.

Optionally, before performing aging compensation on each display area based on the decay ratio of each primary color of each display area, the display screen aging compensation circuit is further configured to: separately obtain temperature values of the display area in at least two sampling periods P for obtaining the display data, where each temperature value corresponds to a decay ratio that is of each primary color of the display area and that is obtained in a same sampling period P; and perform, with reference to a current temperature value of the display area, weighted averaging on decay ratios of a same primary color that separately correspond to different temperature values, to obtain a decay ratio that is of each primary color of the display area and that is corrected based on the temperature value. A technical effect of performing the function by the display screen aging compensation circuit in the electronic device is the same as that described above, and details are not described herein again.

Optionally, the display screen includes a first display area and a second display area. Usage time of the first display area is greater than usage time of the second display area. The performing aging compensation on each display area based on the decay ratio of each primary color of each display area specifically includes: obtaining one gray level value of each primary color of the first display area from a gray level lookup table of the first display area as an input gray level value L_x; and obtaining an output gray level value L_y corresponding to each input gray level value L_x, to constitute a gray level lookup table of the second display area. A technical effect of performing the function by the display screen aging compensation circuit in the electronic device is the same as that described above, and details are not described herein again.

Optionally, the display driver circuit is specifically configured to invoke the gray level lookup table of the first display area and the gray level lookup table of the second display area, and drive the display screen to perform display, so that the first display area and the second display area are approximately consistent in image display brightness and primary color.

Optionally, the performing aging compensation on each display area based on the decay ratio of each primary color of each display area specifically includes: obtaining initial demura data from a demura lookup table; and obtaining an output gray level value L_y corresponding to each input gray level value L_x, to constitute a gray level lookup table of a demura compensation area by using L_y. The initial demura data includes a plurality of demura compensation areas and an input gray level value L_x corresponding to each demura compensation area, and the display area includes at least one demura compensation area. A technical effect of performing the function by the display screen aging compensation circuit in the electronic device is the same as that described above, and details are not described herein again.

Optionally, the display driver circuit is specifically configured to invoke the gray level lookup table of the demura compensation area, and drive the display screen to perform display, so that brightness and a color actually displayed in the display area of the display screen match the decay ratio of the display area, thereby compensating for aging of the display area.

Optionally, the electronic device includes a system on chip, and at least a part of the display screen aging compensation circuit is disposed in the system on chip. Therefore, a circuit structure is simplified.

Optionally, the display screen includes a first display area and a second display area. Usage time of the first display area is greater than usage time of the second display area. The display screen includes a primary display screen and a secondary display screen located on a side of the primary display screen. An active display area of the primary display screen is the first display area of the display screen, and an active display area of the secondary display screen is the second display area of the display screen. When the secondary display screen is bent onto the back of the primary display screen, a display surface of the secondary display screen is far away from a display surface of the primary display screen. The display screen is a dual-fold and outwardly-foldable screen.

Optionally, the display screen further includes a third display area. The usage time of the first display area is greater than usage time of the third display area. The display screen further includes a bent screen located between the primary display screen and the secondary display screen. The bent screen is configured to be bent and deformed when the secondary display screen is bent onto the back of the primary display screen. An active display area of the bent screen is the third display area of the display screen. The display screen is a tri-fold and outwardly-foldable screen.

According to a fourth aspect, an embodiment of this application provides an electronic device. The electronic device includes a memory and a processor. The memory stores a computer program that can run on the processor, and the processor implements any one of the foregoing methods when executing the computer program. The electronic device has a same technical effect as the display screen aging compensation method provided in the foregoing embodiment, and details are not described herein again.

According to a fifth aspect, an embodiment of this application provides a computer-readable medium. The computer-readable medium stores a computer program. Any one of the foregoing methods is implemented when the computer program is executed by a processor. The computer-readable medium has a same technical effect as the display screen aging compensation method provided in the foregoing embodiment, and details are not described herein again.

REFERENCE SIGNS

01—Electronic device; 10—Display screen; 11—Middle frame; 12—Housing; 100—AA area; 101—Non-display area; 20—DDIC; 21—Sub pixel; 201—Pixel circuit; 110—Display area; 120—Primary display screen; 121—Secondary display screen; 122—Bent screen; 30—Display screen aging compensation circuit; 301—Data collection circuit; 302—Decay ratio calculation circuit; 303—Compensation circuit; 40—demura compensation area.

DETAILED DESCRIPTION OF ILLUSTRATIVE EMBODIMENTS

The following describes the technical solutions in the embodiments of this application with reference to the accompanying drawings in the embodiments of this application. It is clearly that the described embodiments are merely a part rather than all of the embodiments of this application.

The following terms “first” and “second” are merely intended for a purpose of description, and shall not be understood as an indication or implication of relative importance or implicit indication of a quantity of indicated technical features. Therefore, a feature limited by “first” or “second” may explicitly or implicitly include one or more features. In the description of this application, unless otherwise stated, “a plurality of” means two or more than two.

In addition, in this application, position terms such as “above”, “below”, “left”, and “right” are defined relative to schematic component positions in the accompanying drawings. It should be understood that these directional terms are relative concepts and are used for relative description and clarification, and may be correspondingly changed based on a change of the component positions in the accompanying drawings.

In this application, unless otherwise specified and limited, the term “coupled” may be directly electrically connected, or may be indirectly electrically connected through an intermediate medium.

Figure 1A:
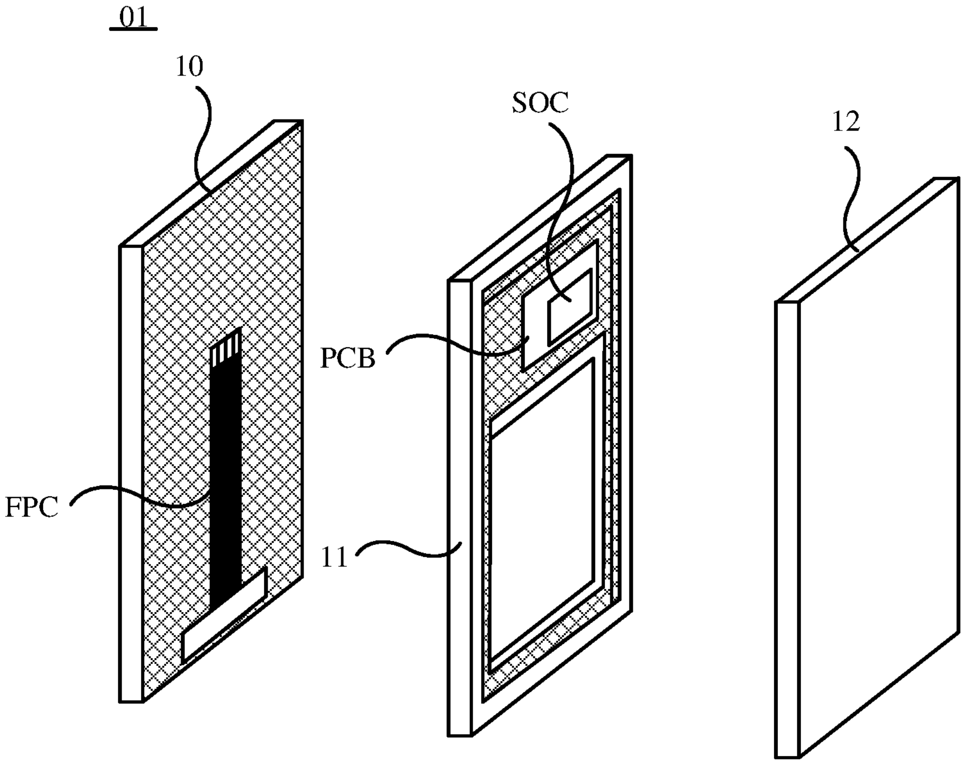
FIG. 1*a* is a schematic structural diagram of an electronic device according to some embodiments of this application.

Embodiments of this application provide an electronic device 01 shown in FIG. 1*a*. The electronic device 01 includes, for example, a mobile phone, a tablet computer, a personal digital assistant (personal digital assistant, PDA), and a vehicle-mounted computer. A specific form of the electronic device 01 is not particularly limited in the embodiments of this application. For ease of description, the following provides descriptions by using an example in which the electronic device 01 is a mobile phone. As shown in FIG. 1*a*, a structure of the electronic device 01 mainly includes a display screen 10, a middle frame 11, and a housing 12. The display screen 10 and the middle frame 11 are disposed in the housing 12.

It should be noted that FIG. 1*a* is described by using an example in which the electronic device 01 includes one display screen 10. In the embodiments of this application, the electronic device 01 includes two display screens 10. The two display screens 10 may be respectively disposed on two sides of the middle frame 11, so that both the front and the back of the electronic device can perform display.

Figure 1B:
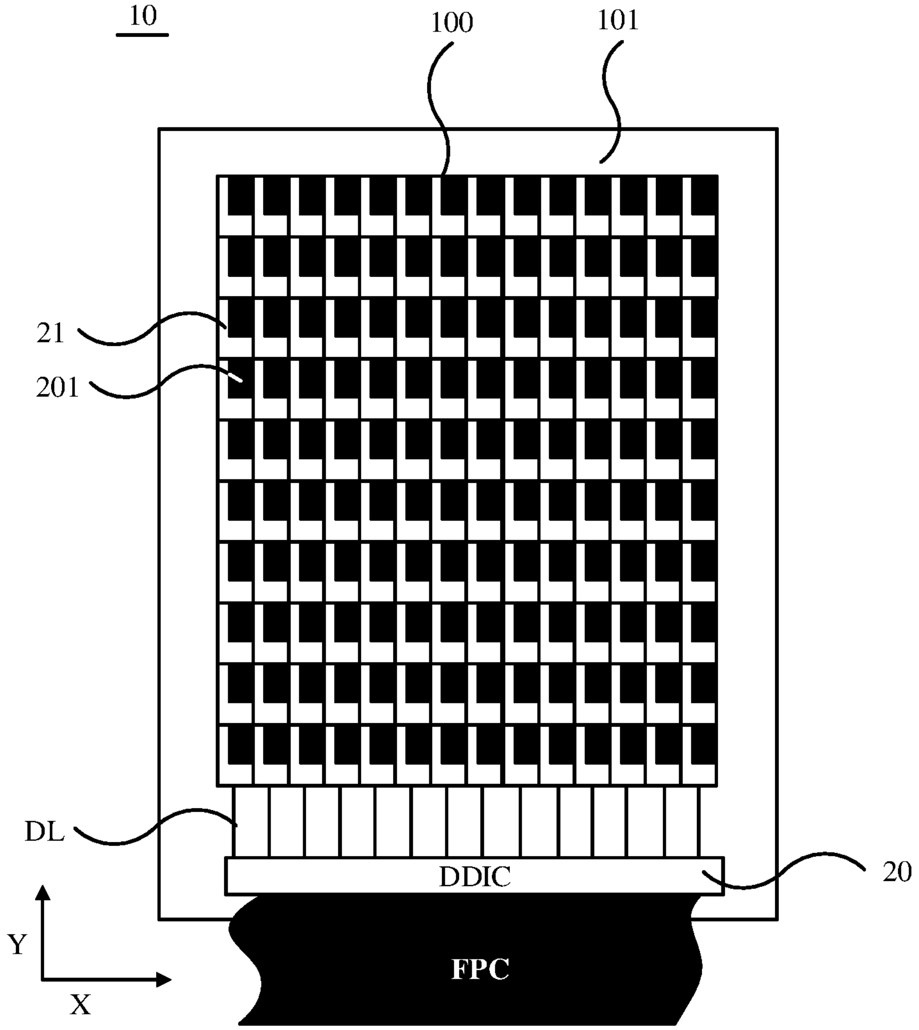
FIG. 1*b* is a schematic structural diagram of a display screen in FIG. 1*a;*

As shown in FIG. 1*b*, the display screen 10 includes an active display area (active area, AA) 100 and a non-display area 101 surrounding the AA area 100. The AA area 100 includes a plurality of sub pixels (sub pixel) 21. For ease of description, this application provides descriptions by using an example in which the plurality of sub pixels 21 are arranged in a form of a matrix.

It should be noted that in the embodiments of this application, sub pixels 21 arranged as one line in a horizontal direction X in FIG. 1*b* are referred to as sub pixels in a same row, and sub pixels 21 arranged as one line in a vertical direction Y are referred to as sub pixels in a same column.

Figure 1C:
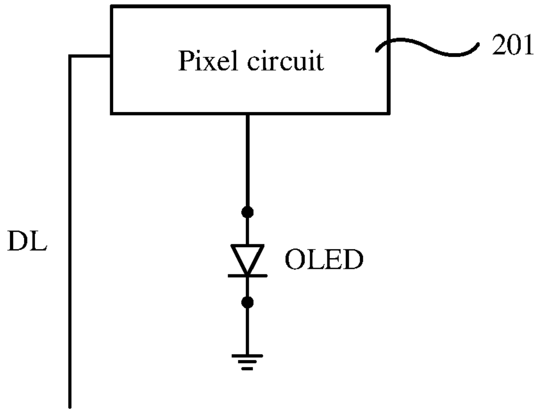
FIG. 1*c* is a schematic structural diagram of a connection between a pixel circuit and an OLED component that are in a sub pixel in FIG. 1*a;*

In the embodiments of this application, the display screen 10 is an OLED display screen. The OLED display screen can implement self-light-emitting. In this case, an OLED component and a pixel circuit 201 configured to drive the OLED component to emit light that are shown in FIG. 1*c* are disposed in the sub pixel 21 in the AA area 100.

In addition, the electronic device may include a display driver circuit configured to drive the display screen 10 to perform display, and the display driver circuit may be coupled to the display screen 10. For example, the display driver circuit may be a display driver integrated circuit (display driver integrated circuit, DDIC). In some embodiments of this application, as shown in FIG. 1*b*, a DDIC 20 is disposed in the non-display area 101 of the display screen 10. Pixel circuits 201 in sub pixels 21 in a same column are coupled to the DDIC 20 by using a same data line (data line, DL). In some other embodiments of this application, the DDIC 20 may be alternatively disposed independently of the display screen 10.

As shown in FIG. 1*a*, the electronic device 01 further includes a printed circuit board (printed circuit board, PCB) and a system on chip (System on Chip, SoC) installed on the PCB. An application processor (application processor, AP) may be disposed in the SoC. The DDIC 20 in FIG. 1*b* is coupled to the SoC by using a flexible printed circuit (flexible printed circuit, FPC).

In this way, display data output by the SoC can be converted into a data voltage Vdata after passing through the DDIC 20, and the data voltage Vdata can be transmitted to pixel circuits 201 that are in the sub pixels 21 and that are coupled to data lines DLs. Next, the pixel circuits 201 generate, by using the data voltage Vdata on the data lines DLs, a drive current I that matches the data voltage Vdata, to drive OLED components in the sub pixels 21 to emit light.

The pixel circuits 201 and the OLED components in the sub pixels 2, the data lines DLs, and the like in the display screen 10 may be manufactured on a substrate. The substrate may be made of a flexible resin material. In this case, the OLED display screen may be used as a foldable display screen. Alternatively, the substrate in the OLED display screen may be made of a relatively hard-textured material, such as glass. In this case, the OLED display screen is a hard display screen.

Figure 2A:
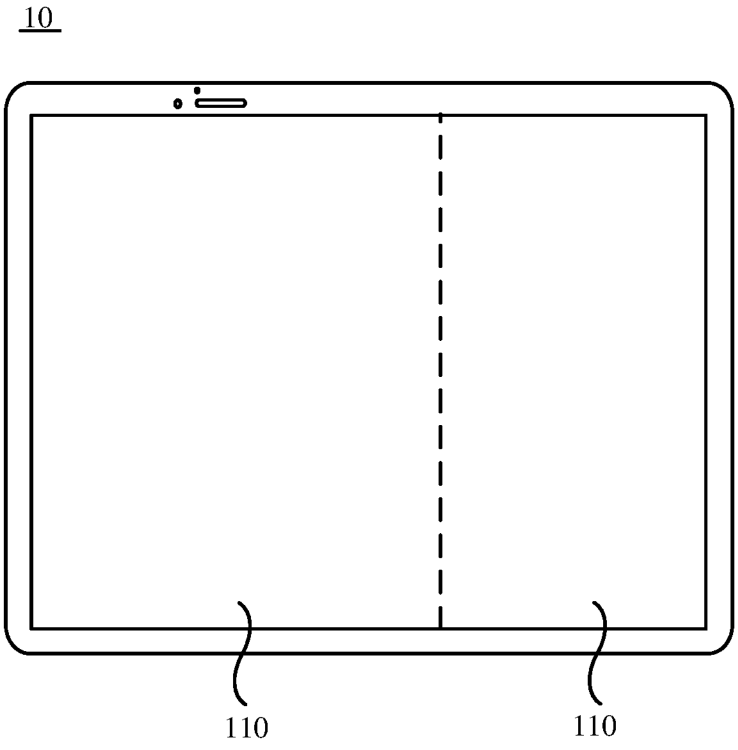
FIG. 2*a* is a schematic structural diagram of a display screen having a plurality of display areas according to some embodiments of this application.

In addition, the display screen 10 may include a plurality of display areas. For example, as shown in FIG. 2*a*, the display screen 10 includes two display areas 110. Different display areas no may have different usage time t. It should be noted that the usage time t in the embodiments of this application is accumulated screen-on (namely, screen light-emitting) time of the display area 110 from a moment at which the display screen 10 is on to a current moment.

Figure 2B:
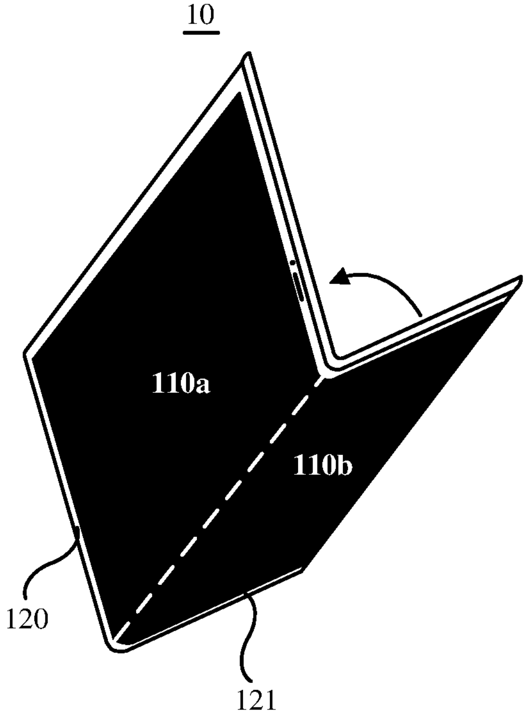
FIG. 2*b* is a schematic diagram of folding the display screen shown in FIG. 2*a;*

For example, the display screen 10 is a foldable display screen. In some embodiments of this application, as shown in FIG. 2*b*, the display screen may include a primary display screen 120 and a secondary display screen 121 located on a side of the primary display screen 120. When the secondary display screen 121 is bent onto the back of the primary display screen 120 in an arrow direction in FIG. 2*b*, a display surface of the secondary display screen 121 is far away from a display surface of the primary display screen 120.

In this case, the display screen 10 having the primary display screen 120 and the secondary display screen 121 is folded outwardly. In other words, after the primary display screen 120 and the secondary display screen 121 are folded, display surfaces of the primary display screen 120 and the secondary display screen 121 are both located on the outside.

Based on this, an AA area of the primary display screen 120 is a first display area 110*a* of the display screen 10, and an AA area of the secondary display screen 121 is a second display area 110*b* of the display screen 10. In this case, the display screen 10 includes two display areas: the first display area 110*a* and the second display area 110*b*.

Usually, for ease of use by a user, the display screen 10 is in a folded state, and only the primary display screen 120 is used for image display, while the secondary display screen 121 is in a screen-off state. When watching a movie or playing a game, to pursue a better visual effect, the user may unfold the primary display screen 120 and the secondary display screen 121 of the display screen 10, so that the primary display screen 120 and the secondary display screen 121 both perform display to obtain a larger display area. Therefore, usage time t1 of the first display area 110*a* of the primary display screen 120 is greater than usage time t2 of the second display area 110*b* of the secondary display screen 121.

Figure 3A:
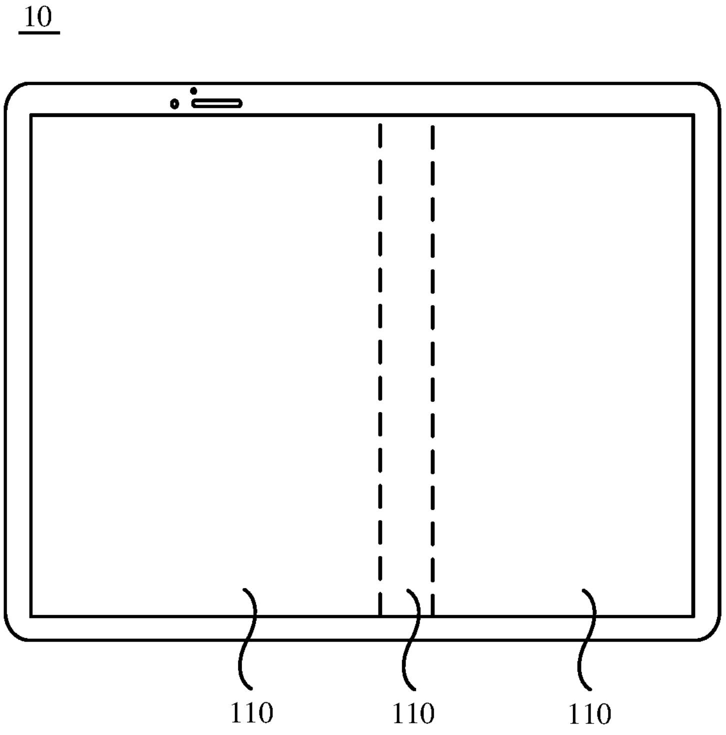
FIG. 3*a* is a schematic structural diagram of another display screen having a plurality of display areas according to some embodiments of this application.

Alternatively, in some other embodiments of this application, as shown in FIG. 3*a*, the display screen 110 includes three display areas with different usage time.

Figure 3B:
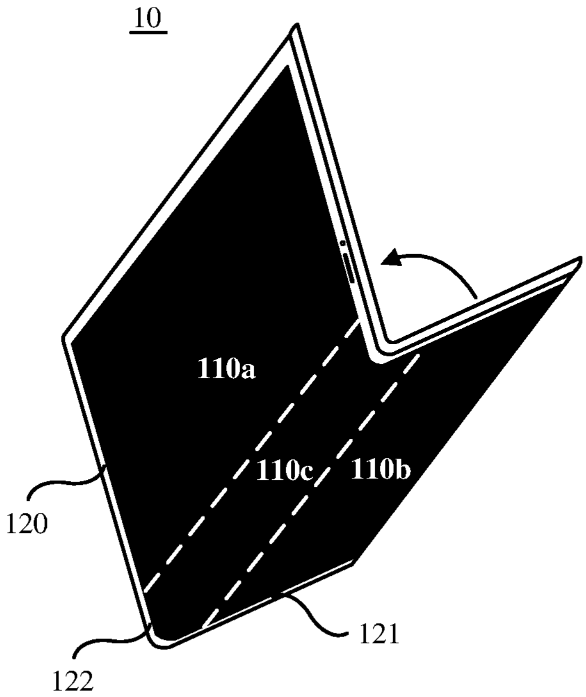
FIG. 3*b* is a schematic diagram of folding the display screen shown in FIG. 3*a;*

For example, the display screen 10 is a foldable display screen. As shown in FIG. 3*b*, the display screen 10 alternatively includes a primary display screen 120, a secondary display screen 121, and a bent screen 122 located between the primary display screen 120 and the secondary display screen 121. The bent screen 122 is configured to be bent and deformed when the secondary display screen 121 is bent onto the back of the primary display screen 120 in an arrow direction in FIG. 3*b*.

In this case, the display screen 10 having the primary display screen 120, the secondary display screen 121, and the bent screen 122 is folded outwardly. In other words, after the primary display screen 120 and the secondary display screen 121 are folded, display surfaces of the primary display screen 120, the secondary display screen 121, and the bent screen 122 are all located on the outside.

Based on this, as shown in FIG. 3*b*, an AA area of the primary display screen 120 is a first display area 110*a* of the display screen 10, an AA area of the secondary display screen 121 is a second display area 110*b* of the display screen 10, and an AA area of the bent screen 122 is a third display area 110*c* of the display screen 10. In this case, the display screen 10 includes three display areas: the first display area 110*a*, the second display area 110*b*, and the third display area 110*c*.

When the display screen 10 is in a folded state, the primary display screen 120 is mainly used for image display. The secondary display screen 121 may perform display when the user takes a selfie. When the user unfolds the display screen 10, the primary display screen 120, the secondary display screen 121, and the bent screen 122 all perform display. Therefore, usage time t1 of the first display area 110*a* of the primary display screen 120 is greater than usage time t2 of the second display area 110*b* of the secondary display screen 121, and the usage time t2 of the second display area 110*b* is greater than usage time t3 of the third display area 110*c* of the bent screen 122.

It should be noted that the foregoing describes only an example of a manner of folding the display screen 10 when the display screen 10 is used as a foldable screen. In some other embodiments, the foldable screen is alternatively folded inwardly or folded outwardly and inwardly, and a manner of setting a quantity of foldable areas in the display screen 10 is not limited to the foregoing two manners, but a setting manner of the display area 110 is the same as that described above. Details are not described one by one herein.

In addition, positions of boundary lines between the first display area 110*a*, the second display area 110*b*, and the third display area 110*c* may be configured as required. This is not limited in this application, provided that it can be ensured that the boundary lines between the areas are located between two adjacent columns (or two adjacent rows) of sub pixels 21.

Figure 4:
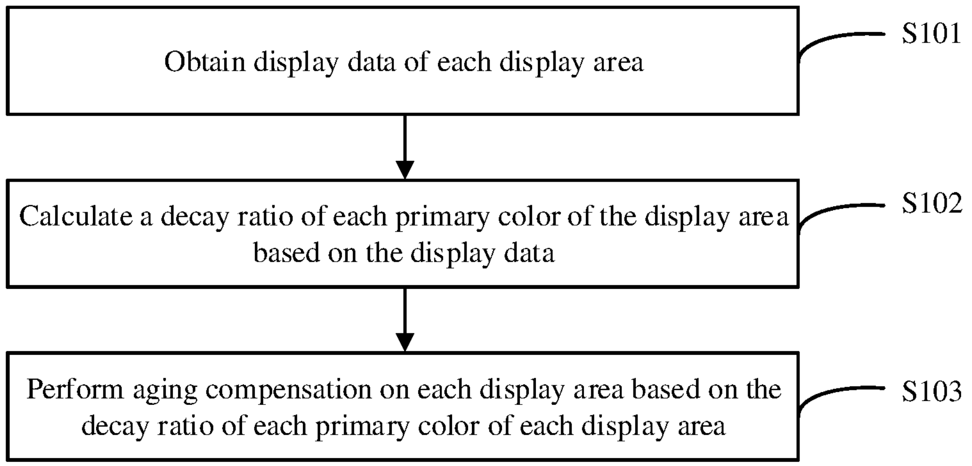
FIG. 4 is a flowchart of a display screen aging compensation method according to some embodiments of this application.

It can be learned from the foregoing that the display areas in the display screen 10 differ in usage time, and therefore the display areas also differ in aging degree. Therefore, to reduce a brightness or color difference that occurs due to an aging difference when the display areas display an image, the embodiments of this application provide an aging compensation method of the display screen 10. As shown in FIG. 4, the aging compensation method includes S101 to S103. To implement S101 to S103, some embodiments of this application provide a circuit system. The circuit system includes a display screen aging compensation circuit 30 shown in FIG. 5. The display screen aging compensation circuit 30 may be configured to perform S101 to S103.

Alternatively, in some other embodiments of this application, the electronic device 01 may include the display screen aging compensation circuit 30.

S101: Obtain display data of each display area 110.

For example, each period of time for obtaining the display data of each display area no may be referred to as a sampling period P.

In some embodiments of this application, the display data may include usage time t of the display area 110, and a maximum gray level value Lev1_max that is of each primary color and that is obtained before the display data is obtained, namely, before a current sampling period P, and an average gray level value Lev1 of each primary color within the usage time t.

Alternatively, in some other embodiments of this application, the display data may further include a maximum brightness value DBV1 max that is of the display area 110 and that is obtained before the display data is obtained and an average brightness value DBV of the display area 110 within the usage time t.

It should be noted that in some of the embodiments of this application, the primary colors may be red (red, R), green (green, G), and blue (blue, B). Alternatively, in some other embodiments, the primary colors may be cyan (cyan, C), magenta (Magenta, M), and yellow (yellow, Y). In some embodiments, the primary colors may alternatively include more than three primary colors. For example, two green primary colors, grass green and emerald, are introduced according to a characteristic that a human eye is most sensitive to green. This is not limited in this application.

In addition, the average gray level value Lev1 and the maximum gray level value Lev1_max of each primary color in the display data mean that display data of one display area 110 includes an average gray level value Lev1 and a maximum gray level value Lev1_max of each primary color.

Figure 5:
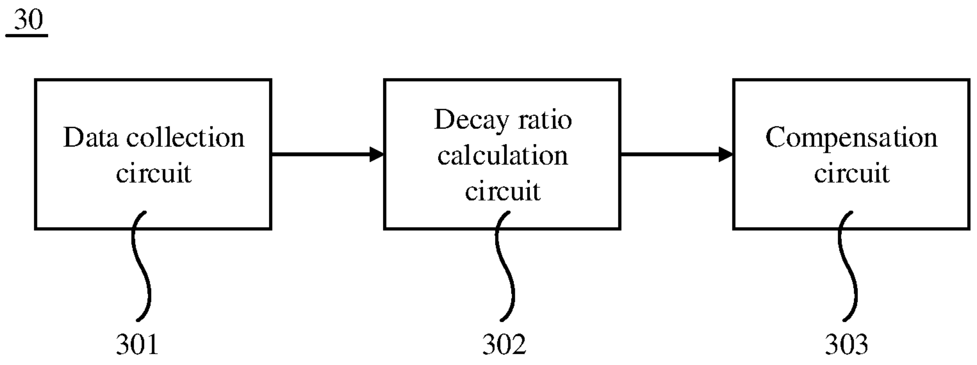
FIG. 5 is a schematic structural diagram of a display screen aging compensation circuit according to some embodiments of this application.

Based on this, to perform S101, the display screen aging compensation circuit 30 may include a data collection circuit 301 shown in FIG. 5. The data collection circuit 301 is configured to obtain the display data of each display area 110 in each sampling period P.

Each display area 110 has a set of display data described above. For example, when the display screen 10 includes the primary display screen 120 and the secondary display screen 121 shown in FIG. 2*b*, the display screen aging compensation circuit 30 needs to separately obtain display data of the first display area 110*a* of the primary display screen 120 and display data of the second display area 110*b* of the secondary display screen 121.

Alternatively, for another example, when the display screen 10 includes the primary display screen 120, the secondary display screen 121, and the bent screen 122 shown in FIG. 3*b*, in addition to separately obtaining display data of the first display area 110*a* of the primary display screen 120 and display data of the second display area 110*b* of the secondary display screen 121, the display screen aging compensation circuit 30 further needs to obtain display data of the third display area 110*c* of the bent screen 122.

The following describes some parameters in the display data by using examples.

It can be learned from the foregoing that the usage time t is accumulated screen-on (namely, screen light-emitting) time of the first display area 110*a* of the display screen 120 from the moment at which the display screen 10 is on to the current moment. For example, before step S101 is performed, the primary display screen 120 has been used for boo hours. When S101 is performed, if the sampling period P is set to 1 minute, accumulated screen-on time of the primary display screen 120 is 100+1/60=100.0167 hours. In other words, usage time of the first display area 110*a* of the primary display screen 120 is T=100.0167 hours.

It should be noted that duration of the sampling period P is not limited in the embodiments of this application, for example, may be 1 minute, 30 seconds, or 2 minutes.

In addition, for example, before step S101 is performed, the secondary display screen 121 has been used for 90 hours. If the secondary display screen 121 is folded onto the back of the primary display screen 120 in the sampling period P and the second display area 110*b* of the secondary display screen 121 is in a screen-off state, accumulated screen-on time of the secondary display screen 121 is 90+0=90 hours. In other words, usage time of the second display area 110*b* of the secondary display screen 121 is t2=90 hours.

Screen-on time of the second display area 110*b* of the secondary display screen 121 that can be accumulated in the sampling period P is 0. A statistics collection manner of usage time t3 of the third display area 110*c* of the bent screen 122 is the same as that described above, and details are not described herein.

In some embodiments, a method for obtaining the average brightness value DBV of the display area, for example, the first display area 110*a* of the primary display screen 120, within the usage time t includes:

first, obtaining a current brightness value DBV_c of the first display area 110*a* when obtaining the display data; and when the current brightness value DBV_c is 0, keeping an average brightness value DBV of the first display area 110*a* of the primary display screen 120 at an average brightness value DBV_aver obtained before the display data is obtained; or when the current brightness value DBV_c is a non-zero value, for example, DBV_c=1023 cd/m$^2$, obtaining an average brightness value DBV of the first display area 110*a* according to the following formula:

$$DBV = (t*60*\text{DBV\_aver} + T*\text{DBV\_c})/(t*60+T) =$$

$$(100*60*4095 + 1*1023)/(100*60+1) = 4094.488 \text{ cd/m}^2,$$

where $t = 100$ hours, $\text{DBV\_aver} = 4095$ cd/m$^2$, and $T = 1$ minute.

The method for obtaining the average brightness value DBV of the display area is described above by using the first display area 110*a* of the primary display screen 120 as an example. Methods for obtaining average brightness values DBV of the second display area 110*b* of the secondary display screen 121 and the third display area 110*c* of the bent screen 122 are the same as that described above, and details are not described herein.

In addition, obtaining the average gray level value Lev of each primary color of the display area, for example, the first display area 110*a* of the primary display screen 120, within the usage time t means separately obtaining a red average gray level value Lev_R, a green average gray level value Lev_G, and a blue average gray level value Lev_B of the first display area 110*a*.

A method for obtaining an average gray level value Lev of each primary color of the first display area 110*a* is described by using obtaining the red average gray level value Lev_R of the first display area 110*a* as an example.

First, in the current sampling period P, when the first display area 110*a* is not on, the red average gray level value Lev_R of the first display area 110*a* of the primary display screen 120 is kept at an average gray level value Lev_aver obtained before the current sampling period.

Alternatively, when the first display area 110*a* is lit up, a current red average gray level value Lev_R_c of the first display area 110*a* is obtained. For example, when Lev_R_c=50, the red average gray level value Lev_R of the first display area 110*a* is obtained according to the following formula:

$$\text{Lev\_R} = (t*60*\text{Lev\_aver}+T*\text{Lev\_R\_c})/(t*60+T) = (100*60*246+1*50)/(100*60+1) = 245.967,$$

where $t = 100$ hours,

LEV_aver = 246, and $T = 1$ minute.

The green average gray level value Lev_G and the blue average gray level value Lev_B of the first display area 110*a* may be obtained by using the foregoing method.

In addition, a manner of obtaining the red average gray level value Lev_R, the green average gray level value Lev_G, and the blue average gray level value Lev_B of the second display area 110*b* of the secondary display screen 121 and a manner of obtaining the red average gray level value Lev_R, the green average gray level value Lev_G, and the blue average gray level value Lev_B of the third display area 110*c* of the bent screen 122 are the same as that described above, and details are not described herein.

S102: Obtain a decay ratio of each primary color of the display area based on the display data of the display area 110.

The decay ratio may be obtained based on an empirical value by using the display data such as the accumulated display time t. For example, based on the empirical value, it can be learned that a red decay ratio is 5% if a maximum gray level value or an average gray level value of red sub pixels in the display screen decays by 5% after 100 hours of accumulated light-emitting. The empirical value may be obtained by collecting statistics on a product, or may be obtained by using an aging experiment.

In some embodiments of this application, to obtain the decay ratio more accurately, the decay ratio is obtained with reference to the display data by using an aging model of each primary color. The aging model may be described by using an aging function or an aging curve.

To perform 102, as shown in FIG. 5, the display screen aging compensation circuit 30 is further configured to obtain the decay ratio of each primary color of the display area based on the aging model of each primary color and the display data of the display area. For example, the display screen aging compensation circuit 30 may further include a decay ratio calculation circuit 302 coupled to the data collection circuit 301. The decay ratio calculation circuit 302 is configured to obtain the decay ratio of each primary color of the display area 110 based on the aging curve of each primary color and the display data of the display area 110.

Figure 6:
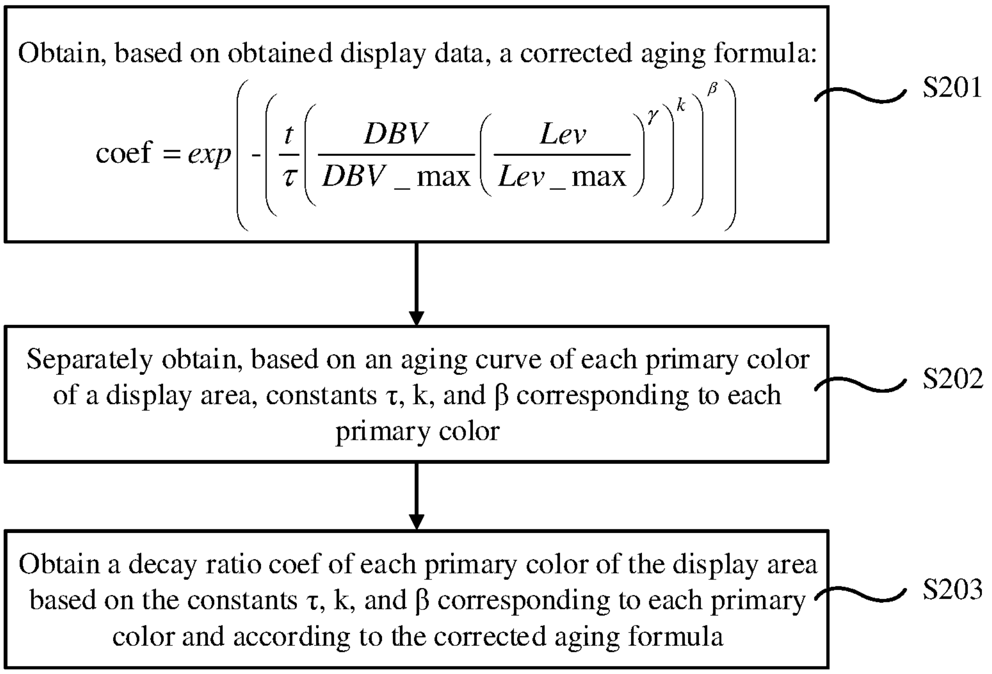
FIG. 6 is a flowchart of an implementation of S102 in FIG. 4.

In the embodiments of this application, when performing S102, the display screen aging compensation circuit 30 may specifically perform S201 to S203 shown in FIG. 6.

S201: Obtain, based on the obtained display data, a corrected aging formula:

$$coef = \exp\left(-\left(\frac{t}{\tau}\left(\frac{DBV}{\text{DBV\_max}}\left(\frac{Lev}{\text{Lev\_max}}\right)^{\gamma}\right)^{k}\right)^{\beta}\right) \quad (1)$$

Specifically, a stretched exponential decay (stretched exponential decay, SED) formula $$coef = \frac{L}{L_0} = \exp\left(-\left(\frac{t}{\tau}\right)^{\beta}\right)$$

is corrected based on the display data obtained in S101, and formula (1) is obtained based on the display data obtained in S101.

coef is the decay ratio of each primary color of the display area, $\gamma$ is a gamma value of the display screen, and $\tau$, k, and $\beta$ are constants. $\gamma$ is a parameter related to a lifetime and initial brightness of the OLED component in the display screen. $\beta$ is a parameter related to a material and a manufacturing process of the OLED component. K is an aging acceleration factor of the OLED component.

In addition, L is a brightness value of the display area 110 in the current sampling period P, and $L_0$ is initial brightness of the display area 110. In some embodiments of this application, the initial brightness $L_0$ may be a brightness value that is of the display area 110 in the first sampling period P and that is obtained after the display screen 10 is on.

S202: Separately obtain, based on the aging model of each primary color of the display area 110, constants $\tau$, k, and $\beta$ corresponding to each primary color.

For example, logarithms of both sides of an equation of formula (1) are taken to obtain the following formula:

Next, logarithms of both sides of an equation of the foregoing formula are taken to obtain the following formula:

$$\text{Ln}(-\text{Ln}(coef)) = \beta*\text{Ln}\left(\frac{t}{\tau}\left(\frac{DBV}{\text{DBV\_max}}\left(\frac{Lev}{\text{Lev\_max}}\right)^{\gamma}\right)^{k}\right) = \beta*\text{Ln}\left(\frac{t}{\tau}\right)+\beta*\text{Ln}\left(\frac{DBV}{\text{DBV\_max}}\left(\frac{Lev}{\text{Lev\_max}}\right)^{\gamma}\right)^{k}.$$

Next, a linear model Y=a0X+a1 may be obtained by continuing to take logarithms of both sides of an equation. Coefficients a0 and a1 in the linear model are related to the three constants $\tau$, k, and $\beta$ in formula (1). In this case, the coefficients a0 and a1 in the linear model may be obtained by using the least square method, to further obtain the constants $\tau$, k, and $\beta$.

Figure 7:
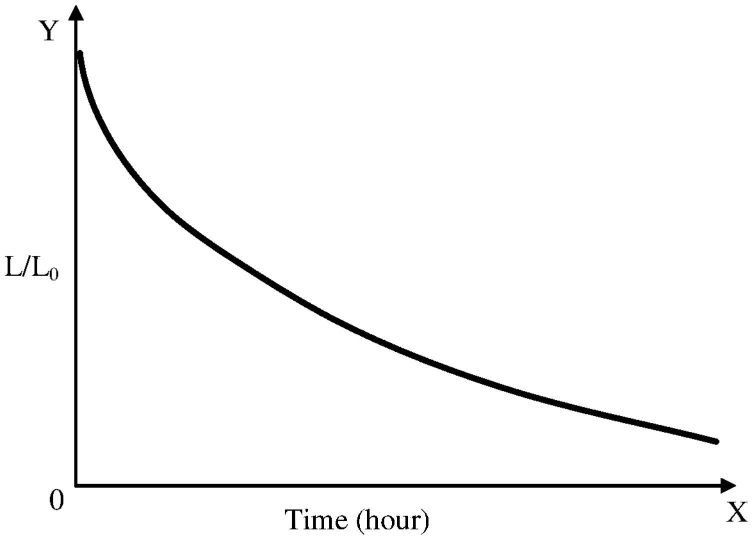
FIG. 7 is a schematic diagram of an aging curve according to some embodiments of this application.

Specifically, a set of known data points (Xi, Yi) is first obtained based on an aging test, where i≥1 and i is a positive integer. A manner of obtaining the known data points may be: for example, for the first display area 110*a* of the primary display screen 120, performing an aging test on the first display area 110*a*. For example, in highest brightness, the first display area 110*a* displays an image of a plurality of specific gray levels, such as a red, green, blue, and white image, and each primary color has four gray levels: 255, 216, 164, and 128. Each time a gray level image is displayed, time (a horizontal coordinate X in FIG. 7) and brightness are measured, and a decay ratio coef=L/$L_0$ (a vertical coordinate Y in FIG. 7) of each primary color is obtained.

The plurality of known data points (Xi, Yi) may be approximately distributed as one straight line, which is referred to as a fitting straight line. The fitting straight line does not pass through all the known data points (Xi, Yi). Next, a curve (namely, the aging curve of each primary color of the display area 110) having a least distance square sum with the fitting straight line is fitted by using the least square principle.

In a process of fitting the aging curve by using the least square method, the coefficients a0 and a1 in the linear model Y=a0X+a1 may be obtained, to finally obtain values of the constants τ, k, and β. For example, in the first display area 110*a*, red corresponds to constants (R_τ0, R_k, R_β), green corresponds to constants (G_τ0, G_k, G_β), and blue corresponds to constants (B_τ0, B_k, B_β).

S203: Obtain the decay ratio of each primary color, for example, a red decay ratio coef1_R, a green decay ratio coef1_G, and a blue decay ratio coef1_B, of the display area, for example, the first display area 110*a*, based on the constants τ, k, and β corresponding to each primary color and according to the corrected aging formula, namely, formula (1).

Likewise, a decay ratio of each primary color, for example, a red decay ratio coef2_R, a green decay ratio coef2_G, and a blue decay ratio coef2_B, of the second display area 110*b* of the secondary display screen 121 may be obtained by using S201 to S203.

In addition, when the display screen has the bent screen 122, likewise, a decay ratio of each primary color, for example, a red decay ratio coef3_R, a green decay ratio coef3_G, and a blue decay ratio coef3_B, of the third display area 110*c* of the bent screen 122 may be obtained.

Based on this, when the display screen aging compensation circuit 30 includes the decay ratio calculation circuit 302, the decay ratio calculation circuit 302 is specifically configured to perform S201 to S203.

Figure 8:
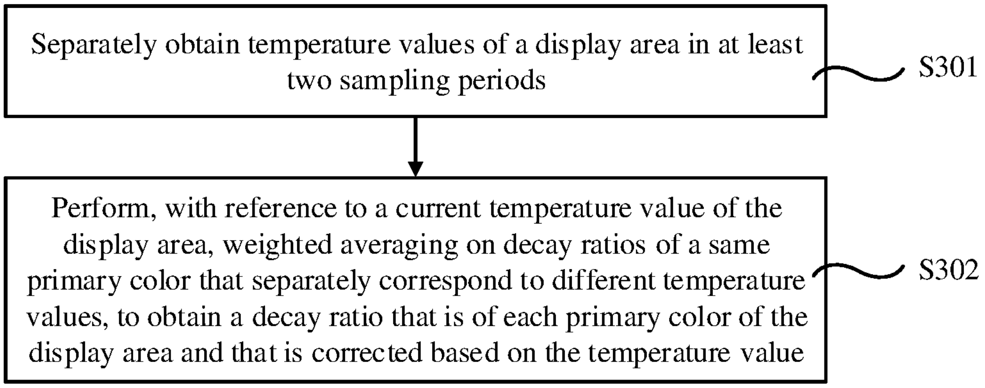
FIG. 8 is a flowchart of another display screen aging compensation method according to some embodiments of this application.

In addition, to improve display screen aging compensation accuracy, aging impact of a temperature factor of the display area 110 may be considered in an aging compensation process. Based on this, the aging compensation method provided in the embodiments of this application further includes S301 and S302 shown in FIG. 8. The display screen aging compensation circuit 30 may be configured to specifically perform S301 and S302.

S301: Separately obtain temperature values of the display area 110 in at least two sampling periods P for obtaining the display data.

To perform S301, in some embodiments of this application, a temperature collection node may be disposed on the back of each display area 110, and a temperature of the collection node may be collected by using, for example, a temperature sensor, to obtain a temperature value of the display area 110.

Next, the display screen aging compensation circuit 30 is further configured to obtain the decay ratio of each primary color of the display area 110 based on the temperature. Specifically, the temperature sensor may transmit the collected temperature to the data collection circuit 301 in FIG. 5. Then, the data collection circuit 301 transmits the temperature value to the decay ratio calculation circuit 302.

Each temperature value corresponds to a decay ratio that is of each primary color of the display area 110 and that is obtained in a same sampling period P.

Figure 9:
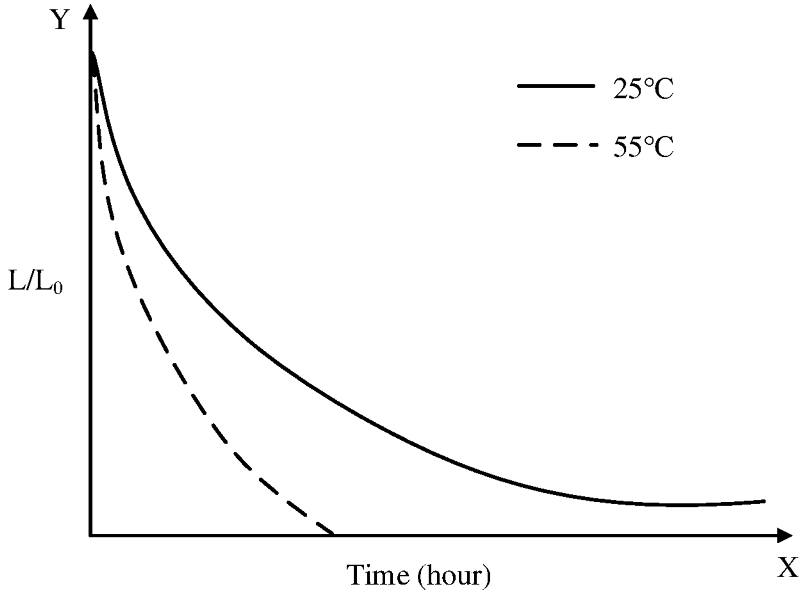
FIG. 9 is a schematic diagram of another aging curve according to some embodiments of this application.

For example, for the first display area 110*a* of the primary display screen 120, at 25° C., the decay ratio calculation circuit 302 performs S202, that is, may obtain an aging curve of each primary color, for example, a red aging curve, as shown in FIG. 9, and obtain, based on the aging curve and the fitted red aging curve, constants (R_τ0_25, R_k_25, R_β_25) corresponding to red of the first display area 110*a* at 25° C.

Likewise, the decay ratio calculation circuit 302 may obtain constants (G_τ0_25, G_k_25, G_β_25) corresponding to green of the first display area 110*a* at 25° C. and constants (B_τ0_25, B_k_25, B_β_25) corresponding to blue of the first display area 110*a* at 25° C.

Next, after performing S203, the decay ratio calculation circuit 302 may obtain a decay ratio of each primary color, for example, a red decay ratio coef1_R_25, a green decay ratio coef1_G_25, and a blue decay ratio coef1_B_25, of the first display area 110*a* at 25° C.

In addition, at 55° C., the decay ratio calculation circuit 302 performs S301, that is, may obtain an aging curve of each primary color, for example, a red aging curve, as shown in FIG. 9, and obtain, based on the aging curve and the fitted red aging curve, constants (R_τ0_55, R_k_55, R_k_55) corresponding to red of the first display area 110*a* at 55° C.

Likewise, the decay ratio calculation circuit 302 may obtain constants (G_τ0_55, G_k_55, G_β_55) corresponding to green of the first display area 110*a* at 55° C. and constants (B_τ0_55, B_k_55, B_β_55) corresponding to blue of the first display area 110*a* at 25° C.

Next, after performing S203, the decay ratio calculation circuit 302 may obtain a decay ratio of each primary color, for example, a red decay ratio coef1_R_55, a green decay ratio coef1_G_55, and a blue decay ratio coef1_B_55, of the first display area 110*a* at 55° C.

In addition, because a temperature change of the display area 110 is a slow change process, a time interval between adjacent sampling periods for temperature collection may be set to be relatively large. In other words, an interval between two adjacent sampling periods for temperature value and display data collection is greater than or equal to an interval between two adjacent sampling periods only for display data collection.

S302: Perform, with reference to a current temperature value of the display area 110, weighted averaging on decay ratios of a same primary color that separately correspond to different temperature values, to obtain a decay ratio that is of each primary color of the display area and that is corrected based on the temperature value.

The current temperature value of the display area 110 is a temperature value temp_cur that is of the display area 110 and that is obtained when the decay ratio calculation circuit 302 performs S302. For example, temp_cur=45 degrees Celsius. For example, for the first display area 110*a* of the primary display screen 120, weighted averaging is performed, by using the following formula (2), on decay ratios of a same primary color that separately correspond to different temperature values, to obtain a red decay ratio of the first display area 110*a* as follows:

$$\text{Coef1}\_cu\_R=\text{coef1}\_R\_25*(1-\alpha)+\text{coef1}\_R\_55*\alpha,$$

where $$A=(45-25)/(55-25)=2/3 \quad (2).$$

Likewise, after the temperature factor is considered, a green decay ratio Coef1_cu_G and a blue decay ratio Coef1_cu_B of the first display area 110*a* may be obtained.

Likewise, after the temperature factor is considered, a decay ratio of each primary color, for example, a red decay ratio Coef2_cu_R, a green decay ratio Coef2_cu_G, and a blue decay ratio Coef2_cu_B, of the second display area 110*b* of the secondary display screen 121 may be obtained by using S301 and S302.

In addition, when the display screen has the bent screen 122, likewise, a decay ratio of each primary color, for example, a red decay ratio Coef3_cu_R, a green decay ratio Coef3_cu_G, and a blue decay ratio Coef3_cu_B, of the third display area 110*c* of the bent screen 122 may be obtained.

S103: Perform aging compensation on each display area 110 based on the decay ratio of each primary color of each display area 110.

To perform the step, the display screen aging compensation circuit 30 further includes a compensation circuit 303 coupled to the decay ratio calculation circuit 302 and the display screen 10. The compensation circuit 303 is configured to perform aging compensation on each display area 110 based on the decay ratio of each primary color of each display area 110.

Figure 10:
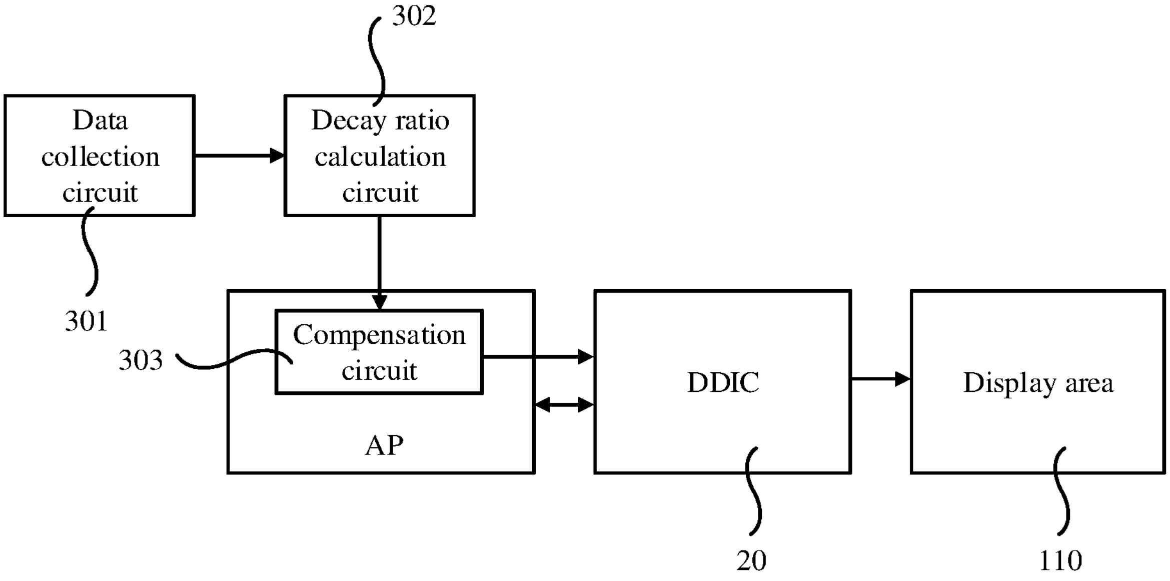
FIG. 10 is another schematic structural diagram of a display screen aging compensation circuit according to some embodiments of this application.

It can be learned from the foregoing that the display screen 10 includes the DDIC 20 shown in FIG. 1*b*, and the electronic device 01 includes the SoC that is shown in FIG. 1*a* and that is coupled to the DDIC 20. In this case, to simplify a circuit structure in the electronic device 01, as shown in FIG. 10, at least a part of the display screen aging compensation circuit 30 in FIG. 5, for example, the data collection circuit 301 and the compensation circuit 303, may be integrated into the SoC. For example, when the SoC includes an AP, the data collection circuit 301 and the compensation circuit 303 may be integrated into the AP. Therefore, the data collection circuit 301 and the compensation circuit 303 do not need to be separately disposed in the electronic device 01, thereby simplifying the circuit structure.

The following describes, by using examples, a manner of performing, by the compensation circuit 303 integrated into the AP, aging compensation on each display area 110 based on the decay ratio of each primary color of each display area 110.

Manner 1

In this example, the compensation circuit 303 in the display screen aging compensation circuit 30 performs S103 by using a gamma correction unit in the AP.

It should be noted that the gamma correction unit in the AP is a digital domain correction unit on an AP end. The gamma correction unit may correct an input gray level value based on the input gray level value by using a gray level lookup table, and transmit a corrected gray level value to the DDIC 20 for display.

Figure 11:
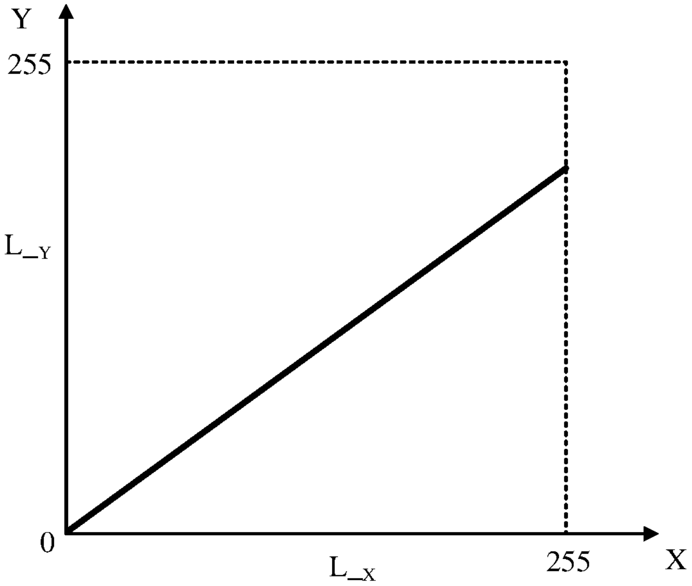
FIG. 11 is a line diagram of a relationship between an input gray level and an output gray level according to some embodiments of this application.

In this case, because the display area 110 is aged in a display process, under a correction effect of the gamma correction unit, a ratio of an output gray level value L_y to an input gray level value L_x is less than 1, as shown in FIG. 11.

Based on this, S103 includes the following steps:

First, the compensation circuit 303 in the display screen aging compensation circuit 30 may be specifically configured to obtain one gray level value of each primary color of the first display area 110*a* from a gray level lookup table of the first display area 110*a* as an input gray level value L_x. For example, L_x=255.

Next, the compensation circuit 303 in the display screen aging compensation circuit 30 is further specifically configured to obtain an output gray level value L_y corresponding to each input gray level value L_x, to constitute a gray level lookup table of the second display area 110*b*. For example, in some embodiments of this application, the compensation circuit 303 may) obtain, according to a first compensation formula $L\_y=L\_x*(coef1/coef2)^{(1/\gamma)}$, the output gray level value L_y corresponding to each input gray level value L_x.

When the electronic device 01 includes the display driver circuit, for example, the DDIC 20, the DDIC 20 may be coupled to the display screen aging compensation circuit 30. In this case, the gray level lookup tables may enable the DDIC 20 to invoke the gray level lookup table of the first display area 110*a* and the gray level lookup table of the second display area 110*b*, and drive the display screen 10 to perform display.

coef1 is a decay ratio of each primary color of the first display area 110*a*. coef2 is a decay ratio of each primary color of the second display area 110*b*. The decay ratios may be decay ratios obtained after the temperature factor is considered and S301 and S302 are performed. In addition, r is the gamma value of the display screen.

For example, a decay ratio that is of red in primary colors of the first display area 110*a* and that is obtained after S301 and S302 are performed is coef1=0.96, and a decay ratio that is of red in primary colors of the second display area 110*b* of the secondary display screen 121 and that is obtained after S301 and S302 are performed is coef2=0.98.

In this case, when the input gray level value L_x=255, the output gray level value $L\_y=255*(0.96/0.98)^{(1/2.2)}=253$ may be obtained according to the first compensation formula. In this case, image brightness and an image color of the first display area 110*a* may be the same as or approximately the same as image brightness and an image color of the second display area 110*b* when the first display area 110*a* displays the gray level value 255 and the second display area 110*b* displays the gray level value 253.

Figure 12:
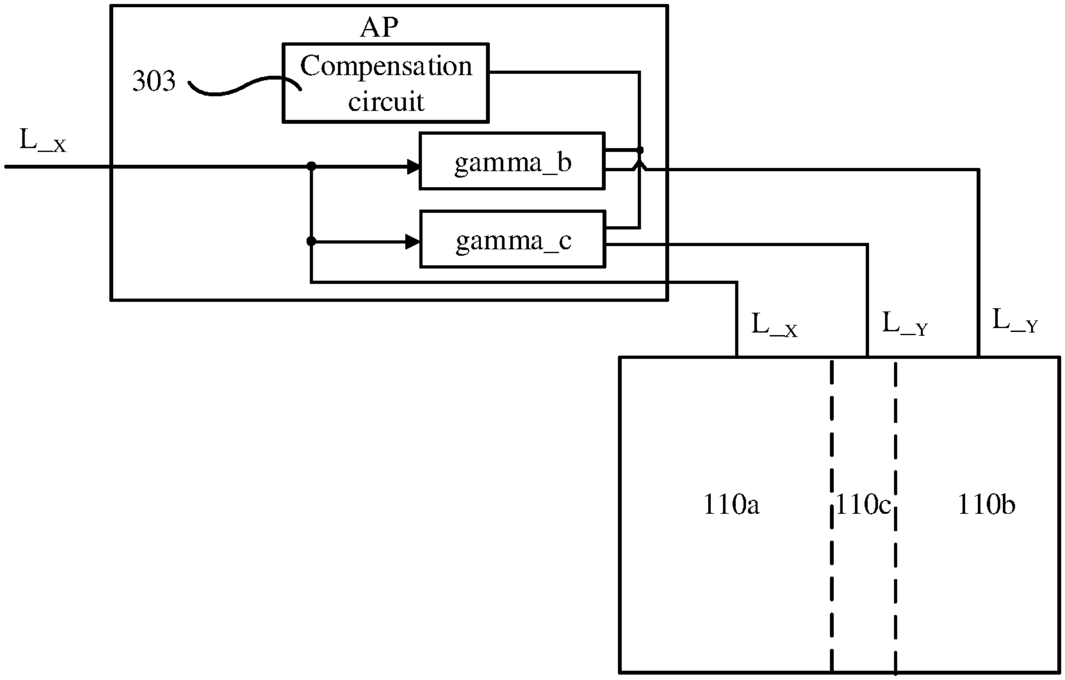
FIG. 12 is a schematic diagram of a display screen aging compensation manner according to some embodiments of this application.

Based on this, 0 to 255 gray level values of each primary color in the gray level lookup table of the first display area 110*a* may be used as the input gray level value L_x one by one, and the output gray level value L_y corresponding to each input gray level value L_x of each primary color may be obtained by using the first compensation formula, to constitute a gray level set gamma_b of the second display area, for example, the second display area 110*b* of the secondary display screen 121 (as shown in FIG. 12). Therefore, when the secondary display screen 121 performs display, the AP may provide a gray level value to the secondary display screen 121 based on the gray level set gamma_b by using the DDIC 20.

Next, the DDIC 20 may drive, based on the input gray level value L_x in the gray level lookup table of the first display area 110*a* of the primary display screen 120, the first display area 110*a* to perform display.

In addition, the DDIC 20 may further obtain, from the gray level lookup table of the second display area 110*b* of the secondary display screen 121 based on the input gray level value L_x, the output gray level value L_y that matches the input gray level value L_x, and drive, based on the output gray level value L_y, the second display area 110*b* to perform display.

It can be learned from the foregoing that, image brightness and an image color of the first display area 110*a* may be the same as or approximately the same as image brightness and an image color of the second display area 110*b* when the first display area 110*a* displays the input gray level value L_x, for example, the gray level value 255, and the second display area 110*b* displays the output gray level value L_y, for example, the gray level value 253, that matches the input gray level value L_x. Therefore, a gray level of the second display area 110*b* with shorter usage time is reduced to perform aging compensation on the first display area 110*a*, so that the first display area 110*a* and the second display area 110*b* with different usage time have a same display effect or approximately same display effects.

Likewise, when the display screen 10 has the bent screen 122, for example, a decay ratio that is of red in primary colors of the first display area 110*a* and that is obtained after S301 and S302 are performed is coef1=0.96, and a decay ratio that is of red in primary colors of the third display area 110*c* of the bent screen 122 and that is obtained after S301 and S302 are performed is coef2=0.99.

In this case, when the input gray level value L_x=255, the output gray level value $L\_y=255*(0.96/0.99)^{(1/2.2)}=251$ may be obtained according to the first compensation formula. In this case, image brightness and an image color of the first display area 110*a* may be the same as or approximately the same as image brightness and an image color of the third display area 110*c* when the first display area 110*a* displays the gray level value 255 and the third display area 110*c* displays the gray level value 253.

In this case, 0 to 255 gray level values of each primary color in the gray level lookup table of the first display area 110*a* may be used as the input gray level value L_x one by one, and the output gray level value L_y corresponding to each input gray level value L_x of each primary color may be obtained by using the first compensation formula, to constitute a gray level set gamma_c of the third display area 110*c* of the bent screen 122 (as shown in FIG. 12). Therefore, when the bent screen 122 performs display, the AP may provide a gray level value to the bent screen 122 based on the gray level set gamma_c by using the DDIC 20.

In conclusion, the compensation circuit 303 in the display screen aging compensation circuit 30 enables, by using the first display area 110*a* of the primary display screen 120 as a reference, the secondary display screen 121 and the bent screen 122 to obtain, from the respective gray level sets, gray level values that meet the first compensation formula with a gray level value displayed on the primary display screen 120, so that when the secondary display screen 121 and the bent screen 122 perform display by using respective gray level lookup tables, the secondary display screen 121 and the bent screen 122 can be approximately consistent with the primary display screen 120 in image display lightness and color.

In conclusion, according to the aging compensation method provided in the embodiments of this application, the decay ratio of each primary color of each display area is obtained based on obtained display data of the first display area 110*a* of the primary display screen 120, display data of the second display area 110*b* of the secondary display screen 121, and display data of the third display area 110*c* of the bent screen 122 in the foldable screen and with reference to the aging formula and the aging curve by using the aging test, and the decay ratio is corrected with reference to the temperature factor.

Then, the respective gray level sets c of the secondary display screen 121 and the bent screen 122 are obtained based on the decay ratio by using the primary display screen 120 as a reference, so that gray level values corrected based on the decay ratio can be found in the respective gray level sets of the secondary display screen and the bent screen based on one gray level value corresponding to each primary color of the primary display screen, and then output to the DDIC 20 to control the secondary display screen 121 and the bent screen 122 to perform display based on the gray level values in the respective gray level sets, so that the secondary display screen 121 and the bent screen 122 are approximately consistent with the primary display screen 120 in image display brightness and primary color, thereby reducing a display effect difference between the secondary display screen 121 and the primary display screen 120 and a display effect difference between the bent screen 122 and the primary display screen 120 in the outwardly-foldable display.

In addition, the method is not only applicable to the three-fold foldable screen having the primary display screen 120, the secondary display screen 121, and the bent screen 122, but also applicable to a foldable screen with more than three folds, where a compensation manner of each display area 110 is the same as that described above. Details are not described one by one herein.

Manner 2

In this example, the compensation circuit 303 in the display screen aging compensation circuit 30 performs S103 by using a demura lookup table in the DDIC 20.

It should be noted that in the embodiments of this application, in "demura", "mura" indicates "nonuniformity", and "de" means "eliminated". Therefore, "demura" means "non-uniformity-eliminated".

Figure 13:
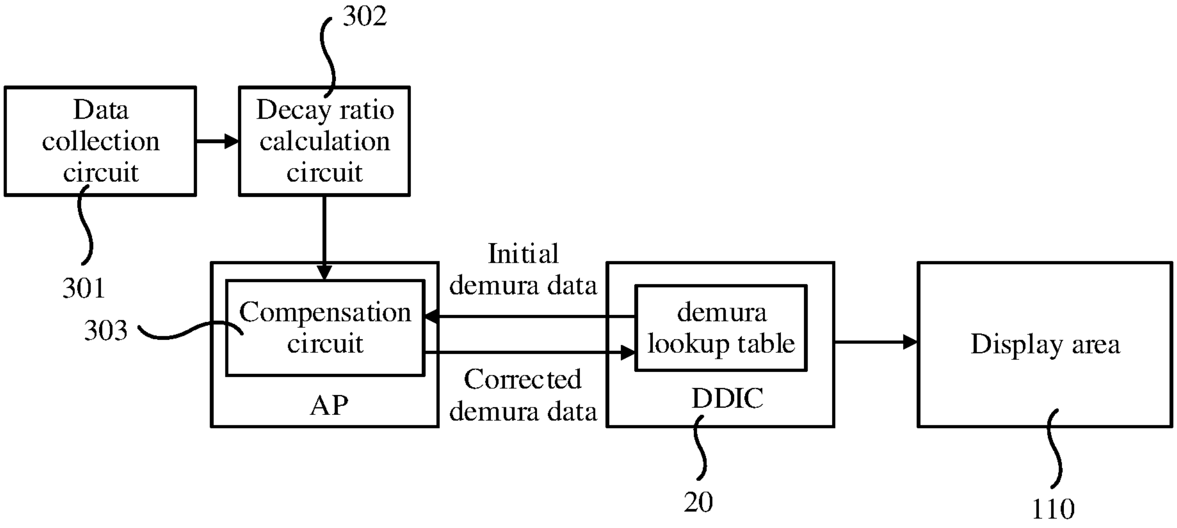
FIG. 13 is a schematic diagram of another display screen aging compensation manner according to some embodiments of this application.

Specifically, S103 includes the following steps:

First, as shown in FIG. 13, the compensation circuit 303 in the display screen aging compensation circuit 30 may obtain initial demura data from the demura lookup table in the DDIC 20.

In some embodiments of this application, the initial demura data includes a plurality of demura compensation areas and an input gray level value L_x corresponding to each demura compensation area. Alternatively, in some other embodiments of this application, the initial demura data further includes a demura compensation coefficient a and a demura offset b.

Figure 14:
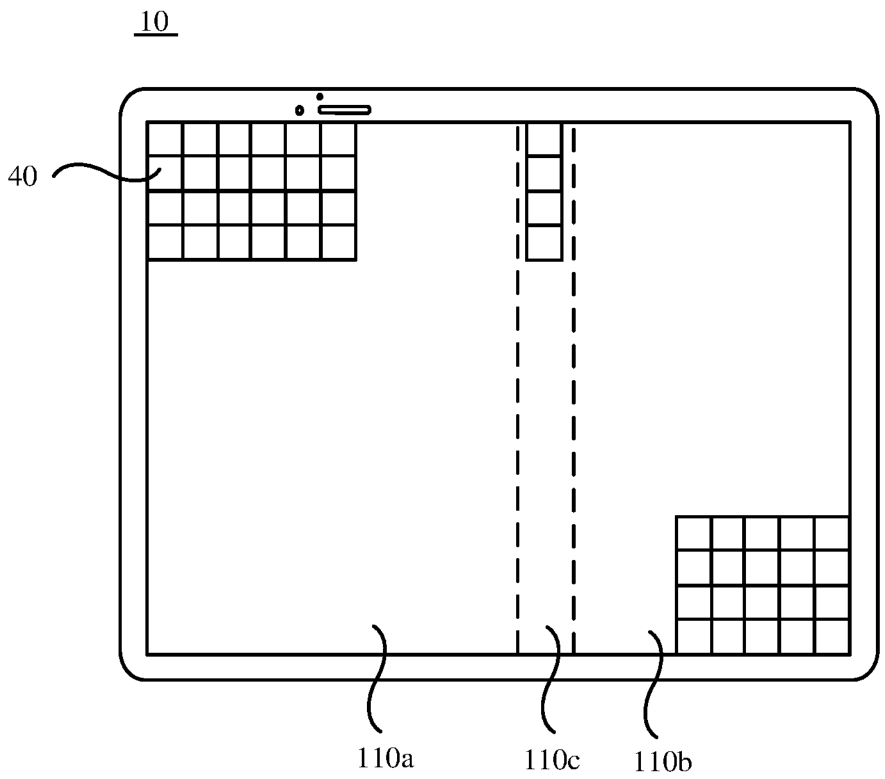
FIG. 14 is a schematic diagram of a demura compensation area setting manner according to some embodiments of this application.

In addition, as shown in FIG. 14, the first display area 110*a* of the primary display screen 120 includes at least one demura compensation area 40. Likewise, the second display area 110*b* of the secondary display screen 121 or the third display area 110*c* of the bent screen 122 includes at least one demura compensation area 40.

Next, the compensation circuit 303 in the display screen aging compensation circuit 30 is specifically configured to obtain an output gray level value L_y corresponding to each input gray level value L_x, namely, a plurality of output gray level values L_y, to constitute a gray level lookup table of the demura compensation area 40. In some embodiments of this application, the compensation circuit 303 in the display screen aging compensation circuit 30 may obtain, according to a second compensation formula L_y=(a*sqrt (coef_d)) *L_x+b, the output gray level value L_y corresponding to each input gray level value L_x.

When the electronic device 01 includes the display driver circuit, for example, the DDIC 20, the DDIC 20 may be coupled to the display screen aging compensation circuit 30. In this case, the gray level lookup table may enable the DDIC 20 to invoke a gray level lookup table of each demura compensation area 40 in the display area 110, and drive the display area 110 of the display screen 10 to perform display.

coef_d is a decay ratio of each primary color of a demura compensation area, and the decay ratio of each primary color of the demura compensation area 40 is the same as a decay ratio of the same primary color of a display area 110 in which the demura compensation area 40 is located.

For example, a decay ratio that is of red in primary colors of the first display area 110*a* and that is obtained after S301 and S302 are performed is coef1=0.96. In this case, a red decay ratio of each demura compensation area 40 in the first display area 110*a* is coef_d_R=coef1=0.96.

Next, after a gray level lookup table of each demura compensation area 40 in the first display area 110*a* is obtained in the foregoing manner, the DDIC 20 may drive, based on an output gray level value L_y in the gray level lookup table of each demura compensation area 40 in the first display area 110*a*, the first display area 110*a* to perform display. Each demura compensation area 40 in the first display area 110*a* performs display based on an output gray level value L_y corrected based on the decay ratio of the first display area 110*a*, so that brightness and a color actually displayed in the first display area 110*a* match the decay ratio of the first display area 110*a*, thereby compensating for aging of the first display area 110*a*.

Likewise, a decay ratio that is of red in primary colors of the second display area 110*b* of the secondary display screen 121 and that is obtained after S301 and S302 are performed is coef2=0.98. A red decay ratio of each demura compensation area 40 in the second display area 110*b* is coef_d_R=coef2=0.98.

Next, after a gray level lookup table of each demura compensation area 40 in the second display area 110*b* is obtained in the foregoing manner, the DDIC 20 may drive, based on an output gray level value L_y in the gray level lookup table of each demura compensation area 40 in the second display area 110*b*, the second display area 110*b* to perform display.

Likewise, a decay ratio that is of red in primary colors of the third display area 110*c* of the bent screen 122 and that is obtained after S301 and S302 are performed is coef2=0.99. A red decay ratio of each demura compensation area 40 in the bent screen 122 is coef_d_R=coef2=0.99.

Next, after a gray level lookup table of each demura compensation area 40 in the third display area 110*c* is obtained in the foregoing manner, the DDIC 20 may drive, based on an output gray level value L_y in the gray level lookup table of each demura compensation area 40 in the third display area 110*c*, the third display area 110*c* to perform display.

It should be noted that the output gray level value L_y is related to a data voltage Vdata provided by the DDIC 20 to the display screen, and the decay ratio coef_d of each primary color of the demura compensation area is related to a drive current I flowing through the OLED component in the sub pixel 21.

In addition, when the drive current I is calculated, the drive current I is related to a square of the data voltage Vdata that is input to the pixel circuit 201 in the sub pixel 21. Therefore, when the initial demura data is recovered based on the decay ratio coef_d, the demura compensation coefficient a in the initial demura data needs to be multiplied by sqrt(coef_d), instead of being directly multiplied by the decay ratio coef_d.

Finally, as shown in FIG. 13, the compensation circuit 303 in the display screen aging compensation circuit 30 writes a gray level lookup table of each demura compensation area 40 into the DDIC 20, so that the DDIC 20 can separately drive, based on the gray level lookup table of each demura compensation area 40 each demura compensation area 40 to perform display.

It can be learned from the foregoing that a difference between this example and example 1 in that the obtained decay ratio of each primary color of each display area 110 is fused with the initial demura data read from a DDIC end, to correct gray level values in the gray level lookup table of each demura compensation area 40 in each display area 110, thereby reducing a display effect difference between the secondary display screen 121 and the primary display screen 120 and a display effect difference between the bent screen 122 and the primary display screen 120 in the foldable display.

In addition, the first display area 110*a* of the primary display screen 120, the second display area 110*b* of the secondary display screen 121, and the third display area 110*c* of the bent screen 122 each include at least one demura compensation area 40. Therefore, each display area may be further divided into a smaller demura compensation area 40 for aging compensation, thereby improving aging compensation precision.

An embodiment of this application provides an electronic device. The computer device includes a memory and a processor. The memory stores a computer program that can run on the processor, and the processor implements the foregoing method when executing the computer program.

The electronic device may include at least one processor. A plurality of processors may be discrete components, or may be integrated into a same chip, for example, an SoC.

In addition, an embodiment of this application provides a computer readable medium. The computer readable medium stores a computer program. The foregoing method is implemented when the computer program is executed by a processor.

The memory may be but is not limited to a read-only memory (read-only memory, ROM) or another type of static storage device that can store static information and instructions, or a random access memory (random access memory, RAM) or another type of dynamic storage device that can store information and instructions, or may be an electrically erasable programmable read-only memory (Electrically Erasable Programmable Read-Only Memory, EEPROM), or any other medium that can be configured to carry or store expected program code in a form of an instruction or a data structure and that can be accessed by a computer. The memory may exist independently, and is connected to the processor by using a communications bus. Alternatively, the memory may be integrated into the processor.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium.

It can be learned from the foregoing that, the aging compensation solutions in example 1 and example 2 both may be implemented by using a combination of a software program and hardware such as at least a part of the display screen aging compensation circuit 30. For example, the data collection circuit 301 and the compensation circuit 303 may be disposed on the SOC, for example, on the AP in the SOC, and the AP having the data collection circuit 301 and the compensation circuit 303 is coupled to the DDIC 20. Alternatively, the data collection circuit 301 and the compensation circuit 303 may be disposed in a display subsystem (display subsystem, DSS), and the DSS is coupled to the DDIC 20. Therefore, screens of different manufacturers can be quickly adapted.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A display screen aging compensation method, comprising:

obtaining display data of each display area of a display screen having at least one display area, wherein:

the at least one display area of the display screen comprises a first display area and a second display area, a usage time of the first display area is greater than a usage time of the second display area, the display data of each display area comprises usage time t of the respective display area, a maximum gray level value Lev_max that is of each primary color and that is obtained before the respective display data, and an average gray level value Lev of each primary color of three primary colors within the respective usage time t, and each usage time is accumulated screen-on time that is of the corresponding display area and that is obtained after the display screen is powered on;

obtaining a decay ratio of each primary color of the at least one display area based on the corresponding display data; and performing aging compensation on each display area based on the decay ratio of each primary color of each display area.

2. The display screen aging compensation method according to claim 1, wherein the display data of each display area further comprises a maximum brightness value DBV_max that is of the respective display area and that is obtained before the display data is obtained and wherein the display data further comprises an average brightness value DBV of each display area within the usage time t.

3. The display screen aging compensation method according to claim 2, wherein the obtaining the decay ratio of each primary color of the at least one display area based on the display data comprises:

obtaining, based on the display data, a corrected aging formula:

$$coef = \exp\left(-\left(\frac{t}{\tau}\left(\frac{DBV}{\mathrm{DBV\_max}}\left(\frac{Lev}{\mathrm{Lev\_max}}\right)^{\gamma}\right)^{k}\right)^{\beta}\right),$$

wherein coef is the decay ratio of each primary color of the at least one display area, wherein y is a gamma value of the display screen, and wherein τ, k, and β are constants;

separately obtaining, based on an aging model of each primary color of the at least one display area, the constants τ, k, and β corresponding to each primary color; and obtaining the decay ratio coef of each primary color of the at least one display area based on the constants τ, k, and β corresponding to each primary color and according to the corrected aging formula.

4. The display screen aging compensation method according to claim 1, further comprising performing, before the performing the aging compensation on each display area:

obtaining, separately, temperature values of the at least one display area in at least two sampling periods P associated with obtaining the display data, wherein each temperature value corresponds to a decay ratio that is of each primary color of the at least one display area and that is obtained in a same sampling period P of the at least two sampling periods; and obtaining the decay ratio that is of each primary color of the at least one display area and that is corrected based on the temperature value by performing, according to a current temperature value of the display area, weighted averaging on decay ratios of a same primary color that separately correspond to different temperature values.

5. The display screen aging compensation method according to claim 4, wherein an interval between two adjacent sampling periods for temperature and display data collection is greater than or equal to an interval between two adjacent sampling periods that are only for display data collection.

6. The display screen aging compensation method according to claim 1, wherein the performing aging compensation on each display area comprises:

obtaining, as an input gray level value L_x, from a gray level lookup table of the first display area, one gray level value of each primary color of the first display area;

obtaining an output gray level value L_y corresponding to each input gray level value L_x, wherein a gray level lookup table of the second display area comprises each output gray level value Ly corresponding to each input gray level value L_x;

driving, based on the input gray level value L_x in the gray level lookup table of the first display area, the first display area to perform display; and obtaining, from the gray level lookup table of the second display area based on the input gray level value L_x, the output gray level value Ly that matches the input gray level value L_x, and driving, based on the output gray level value Ly, the second display area to perform display.

7. The display screen aging compensation method according to claim 6, wherein the obtaining the output gray level value Ly corresponding to each input gray level value L_x comprises:

obtaining, according to a first compensation formula $L\_y=L\_x*(coef1/coef2)^{(1/\gamma)}$, the output gray level value Ly corresponding to each input gray level value L_x, wherein coef1 is a decay ratio of each primary color of the first display area, wherein coef2 is a decay ratio of each primary color of the second display area, wherein r is a gamma value of the display screen, and wherein coef1<coef2.

8. The display screen aging compensation method according to claim 1, wherein the performing the aging compensation on each display area based comprises:

obtaining initial demura data from a nonuniformity-eliminated demura lookup table, wherein the initial demura data comprises a plurality of demura compensation areas and an input gray level value L_x corresponding to each demura compensation area, and wherein the at least one display area comprises at least one demura compensation area of the plurality of demura compensation areas;

obtaining an output gray level value L_y corresponding to each input gray level value L_x, wherein a gray level lookup table of the demura compensation area comprises each output gray level value Ly corresponding to each input gray level value L_x; and driving, based on the output gray level value Ly in a gray level lookup table of each demura compensation area in the display area, the at least one display area to perform display.

9. The display screen aging compensation method according to claim 8, wherein the initial demura data further comprises a demura compensation coefficient a and a demura offset b that correspond to each demura compensation area; and wherein the obtaining the output gray level value Ly corresponding to each input gray level value L_x comprises:

obtaining, according to a second compensation formula L_y=(a*sqrt(coef_d))*L_x+b, the output gray level value Ly corresponding to each input gray level value L_x, wherein coef_d is a decay ratio of each primary color of the demura compensation area, and wherein the decay ratio of each primary color of the demura compensation area is a decay ratio of the same primary color of a display area in which the demura compensation area is located.

10. The display screen aging compensation method according to claim 2, wherein the average brightness value DBV of the at least one display area within the usage time t is obtained by performing at least one of:

obtaining a current brightness value DBV_c of the display area when obtaining the display data; and keeping, in response to the current brightness value DBV_c being 0, the average brightness value DBV of the at least one display area at an average brightness value DBV_aver that is obtained before the display data is obtained; or determining, in response to the current brightness value DBV_c being a non-zero value, the average brightness value DBV according to DBV=(t*60*DBV_aver+T*DBV_c)/(t*60+T), wherein a unit of the usage time t is hour, and a unit of a sampling period P is a minute.

11. An electronic device, comprising:

a display screen;

a display screen aging compensation circuit; and a display driver circuit coupled to the display screen and to the display screen aging compensation circuit;

wherein the display screen aging compensation circuit is configured to:

obtain display data of each display area of the display screen, wherein:

the display screen comprises a first display area and a second display area, a usage time of the first display area is greater than a usage time of the second display area, the display data comprises usage time t of the respective display areas, a maximum gray level value Lev_max that is of each primary color and that is obtained before the display data is obtained, and an average gray level value Lev of each primary color within the usage time t, and the usage time is accumulated screen-on time that is of the respective display areas and that is obtained after the display screen is powered on;

obtain a decay ratio of each primary color of the each display area based on the display data; and perform aging compensation on each display area based on the decay ratio of each primary color of each display area.

12. The electronic device according to claim 11, wherein the display data further comprises a maximum brightness value DBV_max that is of the respective display areas and that is obtained before the display data is obtained and wherein the display data further comprises an average brightness value DBV of the respective display areas within the usage time t; and wherein the obtaining a decay ratio of each primary color of the display area based on the display data specifically comprises:

obtaining, based on the display data, a corrected aging formula:

$$coef = \exp\left(-\left(\frac{t}{\tau}\left(\frac{DBV}{\text{DBV\_max}}\left(\frac{Lev}{\text{Lev\_max}}\right)^{\gamma}\right)^{k}\right)^{\beta}\right),$$

wherein coef is the decay ratio of each primary color of the respective display areas, wherein y is a gamma value of the display screen, and wherein τ, k, and β are constants;

separately obtaining, based on an aging model of each primary color of the respective display areas, the constants τ, k, and β corresponding to each primary color; and obtaining the decay ratio coef of each primary color of the respective display areas based on the constants τ, k, and β corresponding to each primary color and according to the corrected aging formula.

13. The electronic device according to claim 11, wherein the display screen aging compensation circuit is further configured to, before performing the aging compensation on each display area:

obtain, separately, temperature values of the respective display areas in at least two sampling periods P for obtaining the display data, wherein each temperature value corresponds to a decay ratio that is of each primary color of the respective display areas and that is obtained in a same sampling period P of the at least two sampling periods P; and obtain a decay ratio that is of each primary color of the respective display areas and that is corrected based on the temperature value by performing, with reference to a current temperature value of the respective display areas, weighted averaging on decay ratios of a same primary color that separately correspond to different temperature values.

14. The electronic device according to claim 11, wherein the performing aging compensation on each display area based on the decay ratio of each primary color of each display area comprises:

obtaining one gray level value of each primary color of the first display area from a gray level lookup table of the first display area as an input gray level value L_x; and obtaining an output gray level value L_y corresponding to each input gray level value L_x, wherein a gray level lookup table of the second display area comprises each output gray level value Ly corresponding to each input gray level value L_x; and wherein the display driver circuit is configured to invoke the gray level lookup table of the first display area and the gray level lookup table of the second display area, and drive the display screen to perform display.

15. The electronic device according to claim 11, wherein the performing aging compensation on each display area based on the decay ratio of each primary color of each display area comprises:

obtaining initial demura data from a demura lookup table; and obtaining an output gray level value L_y corresponding to each input gray level value L_x, wherein a gray level lookup table of a demura compensation area comprises each output gray level value Ly corresponding to each input gray level value L_x, wherein the initial demura data comprises a plurality of demura compensation areas and an input gray level value L_x corresponding to each demura compensation area, and wherein at least one of the first display area and the second display area comprises at least one of the plurality of demura compensation areas; and wherein the display driver circuit is configured to invoke the gray level lookup table of the demura compensation area, and drive the display screen to perform display.

16. The electronic device according to claim 11, wherein the electronic device further comprises a system on chip, and at least a part of the display screen aging compensation circuit is disposed in the system on chip.

17. The electronic device according to claim 11, wherein the display screen comprises a primary display screen and a secondary display screen located on a side of the primary display screen, wherein an active display area of the primary display screen is the first display area, and wherein an active display area of the secondary display screen is the second display area; and wherein, when the secondary display screen is bent onto a back of the primary display screen, a display surface of the secondary display screen is separated from a display surface of the primary display screen.

18. The electronic device according to claim 17, wherein the display screen further comprises a third display area, and wherein the usage time of the first display area is greater than a usage time of the third display area; and wherein the display screen further comprises a bent screen located between the primary display screen and the secondary display screen, wherein the bent screen is configured to be bent and deformed when the secondary display screen is bent onto the back of the primary display screen; and wherein an active display area of the bent screen is the third display area.

* * * * *